US006426602B1

(12) United States Patent
McCann et al.

(10) Patent No.: US 6,426,602 B1
(45) Date of Patent: Jul. 30, 2002

(54) MINIMIZATION OF MOTOR TORQUE RIPPLE DUE TO UNBALANCED CONDITIONS

(75) Inventors: Roy Alan McCann; Sayeed A. Mir, both of Saginaw; Dennis B. Skellenger; Mark Philip Colosky, both of Vassar, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/659,244

(22) Filed: Sep. 11, 2000

Related U.S. Application Data

(60) Provisional application No. 60/154,307, filed on Sep. 16, 1999, and provisional application No. 60/175,545, filed on Jan. 11, 2000.

(51) Int. Cl.[7] .............................................. H02P 7/00
(52) U.S. Cl. ..................... 318/432; 318/284; 318/138; 318/599; 318/629
(58) Field of Search ............................... 318/254, 432, 318/437, 599, 629, 138

(56) References Cited

U.S. PATENT DOCUMENTS

| | | | |
|---|---|---|---|
| 4,300,081 A | 11/1981 | Van Landingham | 318/599 |
| 4,458,192 A | * 7/1984 | Sakamoto et al. | 318/798 |
| 4,458,193 A | 7/1984 | Jonsson | 318/803 |
| 4,661,756 A | 4/1987 | Murphy et al. | 318/701 |

(List continued on next page.)

OTHER PUBLICATIONS

"Pulsating Torque Minimization Techniques For Permanent Magnet AC Motor Drives—A Review"; Thomas M. Jahns and Wen L. Soong; IEEE Transactions On Industrial Electronics, vol. 43, No. 2, Apr. 1996, pp. 321–330.

"Modeling, Indentification, and Compensation of Pulsating Torque in Permanent Magnet AC Motors"; Gianni Ferretti, Gianantonio Magnani and Paulo Rocco; IEEE Transactions on Industrial Electronics, vol. 45, No. 6, Dec. 1998, pp. 912–920.

"Compensation of Permanent Magnet Motors Torque Ripple by Means of Current Supply Waveshapes Control Determined by Finite Element Method": S. Clenet, Y. Lefevere, N. Sadowski, S. Astier and M. Lajoie–Mazence; IEEE Transactions on Magnetics, vol. 29, No. 2, Mar. 1993, pp. 2019–2023.

"Indentification and Compensation of Torque Ripple in High–Precision Permanent Magnet Motor Drives"; Joachim Holtz and Lothar Springob; IEEE Transactions On Industrial Electronics, vol. 43, No. 2, Apr. 1996, pp. 309–320.

"Torque Harmonics Minimisation In Permanent Magnet Sychronous Motor With Back EMF Estimation"; K.Y. Cho, J.D. Bae, S.K. Chung and M.J. Youn; IEE Proc.–Electr. Power Appl., vol. 141, No. 6, Nov., 1994, pp. 323–330.

"Torque Ripple Attenuation In Permanent Magnet Sychronous Motors"; Renato Carlson, Alvacir A. Tavares, Joao P. Bastos and Michel Lajoie–Mazenc; Record of IEEE Industrial Applications Society Annual Meeting, 1989, pp. 57–62.

*Primary Examiner*—Robert E. Nappi
*Assistant Examiner*—Rita Leykin
(74) *Attorney, Agent, or Firm*—Edmond P. Anderson

(57) ABSTRACT

A method of minimizing the torque ripple produced by unbalanced phase currents in a sinusoidally excited motor is disclosed. The method comprises measuring the position of the motor; sampling the phase currents of the motor generating thereby at least one phase current; synchronizing the at least one phase current of the motor with the position of the motor; determining the imbalance in the magnitudes of the at least one phase current of the motor; generating a set of modulation index terms for reducing the imbalance in the magnitudes of the at least one phase current to ensure acceptable torque ripple characteristics over the operating velocity of the motor; and generating a set of minimized line-to-ground voltage commands.

41 Claims, 10 Drawing Sheets

U.S. PATENT DOCUMENTS

| | | | |
|---|---|---|---|
| 4,691,269 A | | 9/1987 | Yamane et al. ............... 363/41 |
| 4,825,132 A | | 4/1989 | Gritter ....................... 318/811 |
| 5,059,878 A | * | 10/1991 | Bardelang et al. .......... 318/490 |
| 5,155,419 A | * | 10/1992 | Naito .......................... 318/254 |
| 5,257,828 A | * | 11/1993 | Miller et al. ............... 180/79.1 |
| 5,319,294 A | * | 6/1994 | Ohto et al. ............ 318/568.22 |
| 5,451,900 A | | 9/1995 | Haga et al. ................... 330/10 |
| 5,616,999 A | * | 4/1997 | Matsumura et al. ........ 318/632 |
| 5,625,542 A | | 4/1997 | Stemmler et al. ............. 363/41 |
| 5,646,496 A | * | 7/1997 | Woodland et al. .......... 318/632 |
| 5,760,562 A | | 6/1998 | Woodland et al. .......... 318/632 |
| 5,867,380 A | * | 2/1999 | Lee .............................. 363/98 |
| 5,998,945 A | | 12/1999 | Elliott ........................ 318/254 |
| 6,002,226 A | | 12/1999 | Collier-Hallman et al. . 318/439 |
| 6,008,599 A | * | 12/1999 | Beck ........................... 318/254 |
| 6,046,560 A | | 4/2000 | Lu et al. ..................... 318/432 |
| 6,049,473 A | | 4/2000 | Jang et al. .................... 363/89 |
| 6,051,942 A | | 4/2000 | French ....................... 318/254 |
| 6,124,688 A | | 6/2000 | Coles et al. ................ 318/254 |
| 6,107,767 A | * | 8/2000 | Lu et al. ..................... 318/561 |

* cited by examiner

MINIMIZATION OF MOTOR TORQUE RIPPLE DUE TO UNBALANCED CONDITIONS

CROSS REFERENCE TO RELATED APPLICATIONS

This application claims the benefit of U.S. Provisional Application No. 60/154,307 filed on Sep. 16, 1999 which is incorporated herein by reference. This application claims the benefit of U.S. Provisional Application No. 60/175,545 filed on Jan. 11, 2000 which is incorporated herein by reference.

TECHNICAL FIELD

This invention describes various methods for minimizing torque ripple produced by unbalanced phase currents in a sinusoidally excited motor.

BACKGROUND OF THE INVENTION

Unbalanced phase currents are due primarily to resistance imbalances in the motor and controller. A review is given in T. Jahns and W. Soong, "Pulsating torque minimization techniques for permanent magnet ac motor drives—a review," *IEEE Transactions on Industrial Electronics*, vol. 43, no. 2, pp. 321–330, April 1996, incorporated herein by reference, of the established methods of minimizing torque ripple along with a summary of the limitations of the existing techniques. An extensive reference list is provided in T. Jahns and W. Soong, which covers the various types of permanent magnet machines including those with trapezoidal back emf and rotor saliency. Torque ripple and pulsations arise from various sources such as magnetic reluctance effects, airgap mmf harmonics, power electronic nonlinearities and unbalanced three phase parameters. Each of these contributors produce a characteristic frequency of torque ripple. A graphical depiction 10 of torque versus position in mechanical degrees for a typical sinusoidal permanent magnet ac motor (PMAC) is shown in FIG. 1.

Referring to FIG. 2, a graphical representation 12 of the spectrum of the torque of FIG. 1 is shown. It is seen in FIG. 2 that the predominant harmonics are the second, sixth, $12^{th}$, $18^{th}$, $24^{th}$ and $48^{th}$. The $24^{th}$ and $48^{th}$ are associated with errors induced in a power electronic motor drive by sensor errors in the position feedback. These components are reduced as the position sensor resolution is increased. The $12^{th}$ and $18^{th}$ are created by magnetic reluctance variations. These components have a frequency determined by the number of slots per pole and the presence of rotor saliency in the motor magnetic design. The sixth harmonic is due primarily to harmonic distortion in the motor flux linkage (or back emf) characteristics and power electronic nonlinearities. The second harmonic is due to unbalanced conditions in the three phase system. The literature in motor drive technology contains several methods of minimizing the torque ripple associated with the various harmonics. A disturbance torque model in G. Ferretti, G. Magnani, and P. Rocco, "Modeling, identification and compensation of pulsating torque in permanent magnet ac motors," *IEEE Transactions on Industrial Electronics*, vol. 45, no. 6, pp. 912–920, December 1998, incorporated herein by reference, is proposed which identifies model parameters for all sources of torque ripple during a start-up test sequence for industrial robot manipulators. This method has the drawbacks of a computationally intensive on-line identification algorithm that is not suitable for many applications. In addition, the results are only valid for incremental quasi-static (zero velocity) position control operations.

The frequency components due to magnetic reluctance effects and flux linkage distortion is addressed in S. Clenet, N. Sadowski, S. Astier, and M. Lajoie-Mazenc, "Compensation of permanent magnet motors torque ripple by means of current supply waveshapes control determined by finite element method," *IEEE Transactions on Magnetics*, vol. 29, no. 2, pp. 2019–23, March 1993, incorporated herein by reference. This method minimizes torque ripple by injecting compensating phase currents based on a profile derived from a priori finite element studies of the motor magnetic characteristics. This method has the restriction that the motor characteristics do not vary significantly with flux level (i.e., minimal saturation effects) or temperature. An adaptive torque ripple minimization scheme is disclosed in J. Holtz and L. Springob, "Identification and compensation of torque ripple in high-precision permanent magnet motor drives," *IEEE Transactions on Industrial Electronics*, vol. 43, no. 2, pp. 309–320, April 1996, incorporated herein by reference. This method uses a phase current compensation method as in Clenet, Sadowski, Astier and Lajoie-Mazenc using an on-line parameter identification routine at start-up as in Ferretti, Magnani and Rocco. A high bandwidth controller is used to inject compensating currents into the motor based on look-up tables created from the on-line identification routine. The disadvantages again include numerically intensive algorithms that may not be allowed during start-up of an electric machine in many applications.

K.-Y. Cho, J.-D. Bae, S.-K. Chung, M.-J. Youn, "Torque harmonics minimization in permanent magnet synchronous motor with back emf estimation," *IEE Proceedings in Electric Power Applications*, vol. 141, no. 6, 1994, pp. 323–330, incorporated herein by reference, presents a method of compensating for flux linkage (back emf) distortion using a predictive current control scheme. This technique is shown to be a practical and effective method in reducing torque ripple due to flux linkage distortion such as the sixth harmonic shown in FIG. 2. As an alternative to active compensation for flux linkage distortion, R. Carlson, A. Tavares, J. Bastos, and M. Lajoie-Mazenc, "Torque ripple attenuation in permanent magnet synchronous motors," *Record of IEEE Industrial Applications Society Annual Meeting*, 1989, pp. 57–62, incorporated herein by reference, discusses the theory of designing a PMAC with minimized back emf harmonics.

Typically, the largest source of torque ripple is the sixth harmonic induced by flux linkage distortion. Compensation for this component has been covered extensively and most notably in Cho, Bae, Chung and Youn. High frequency ripple caused by position sensor feedback errors can often be minimized by feedback control techniques applied to velocity and torque signals. The next most significant source of torque ripple is due to imbalances in the three phase system. Compensation of circuit imbalance effects in a PMAC motor is addressed in Ferretti, Magnani and Rocco; however it is treated only as a generic disturbance effect without regard to the theoretical background of this component. The effect of circuit imbalances is difficult to compensate for because the source of most imbalances is from thermal effects and component tolerances including variation over product life. There is an extensive literature in the analysis of unbalanced three phase systems. However, most unbalanced electric motor theory is applied to single phase induction motors where the machine torque production is created by a deliberate circuit imbalance (i.e., a split phase machine).

SUMMARY OF THE INVENTION

A method of minimizing the torque ripple produced by unbalanced phase currents in a sinusoidally excited motor is disclosed. The method comprises measuring the position of the motor; sampling the phase currents of the motor generating thereby at least one phase current; synchronizing the at least one phase current of the motor with the position of the motor; determining the imbalance in the magnitudes of the at least one phase current of the motor; generating a set of modulation index terms for reducing the imbalance in the magnitudes of the at least one phase current to ensure acceptable torque ripple characteristics over the operating velocity of the motor; and generating a set of minimized line-to-ground voltage commands.

DESCRIPTION OF THE DRAWINGS

The present invention will now be described, by way of example, with reference to the accompanying drawings, in which.

DETAILED DESCRIPTION OF THE INVENTION

Figure 1:
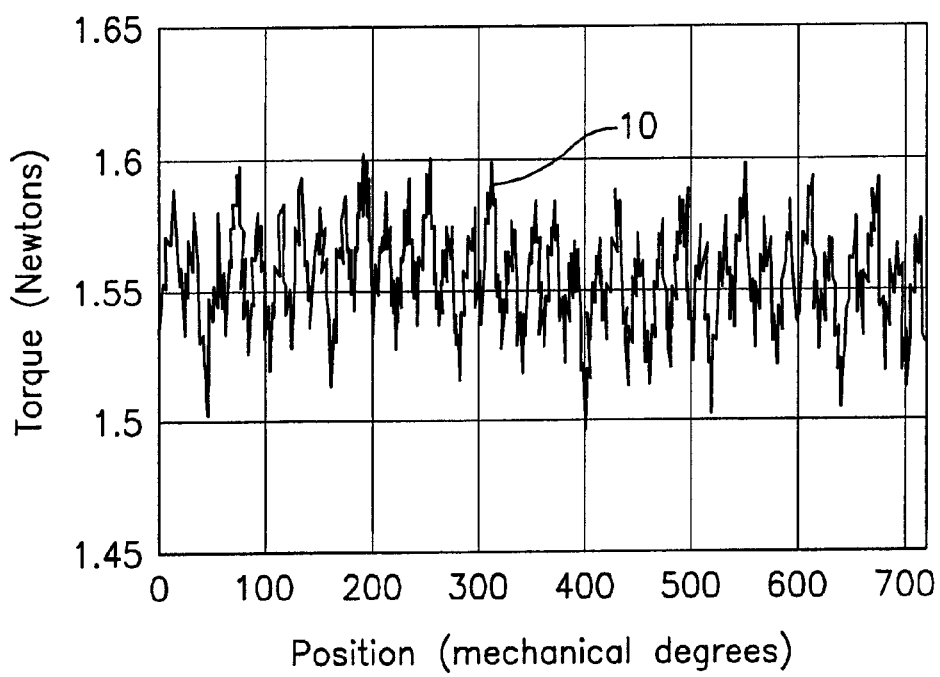
FIG. 1 is a graphical representation of output torque versus position for a sinusoidal permanent magnetic AC motor.
Figure 2:
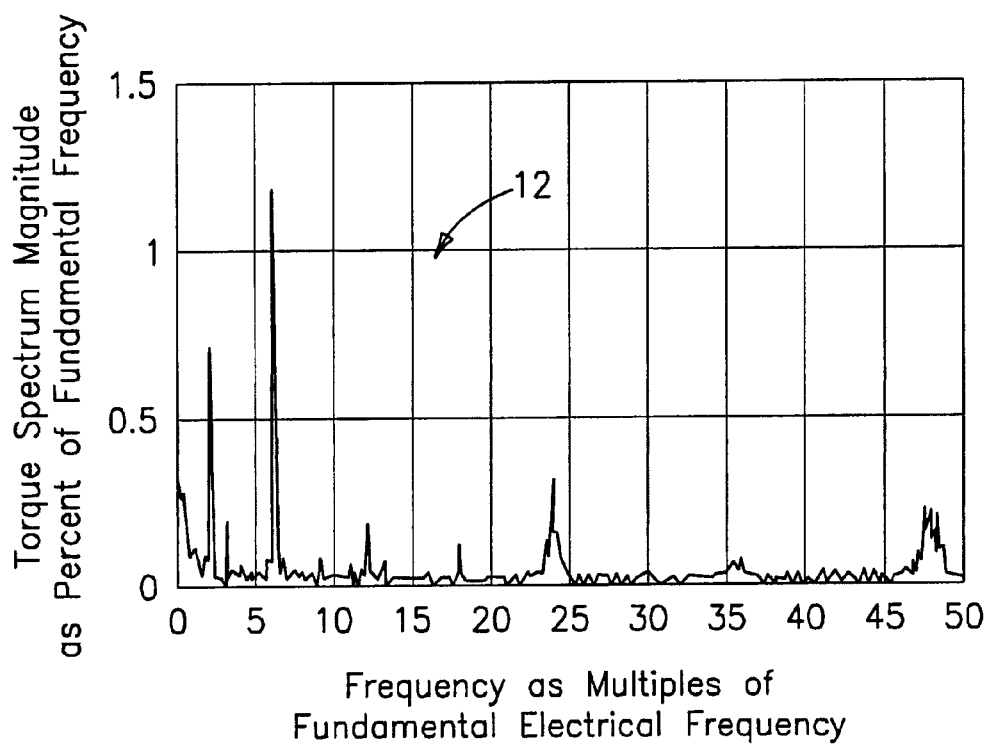
FIG. 2 is a graphical representation of the spectrum of the torque of FIG. 1.
Figure 3:
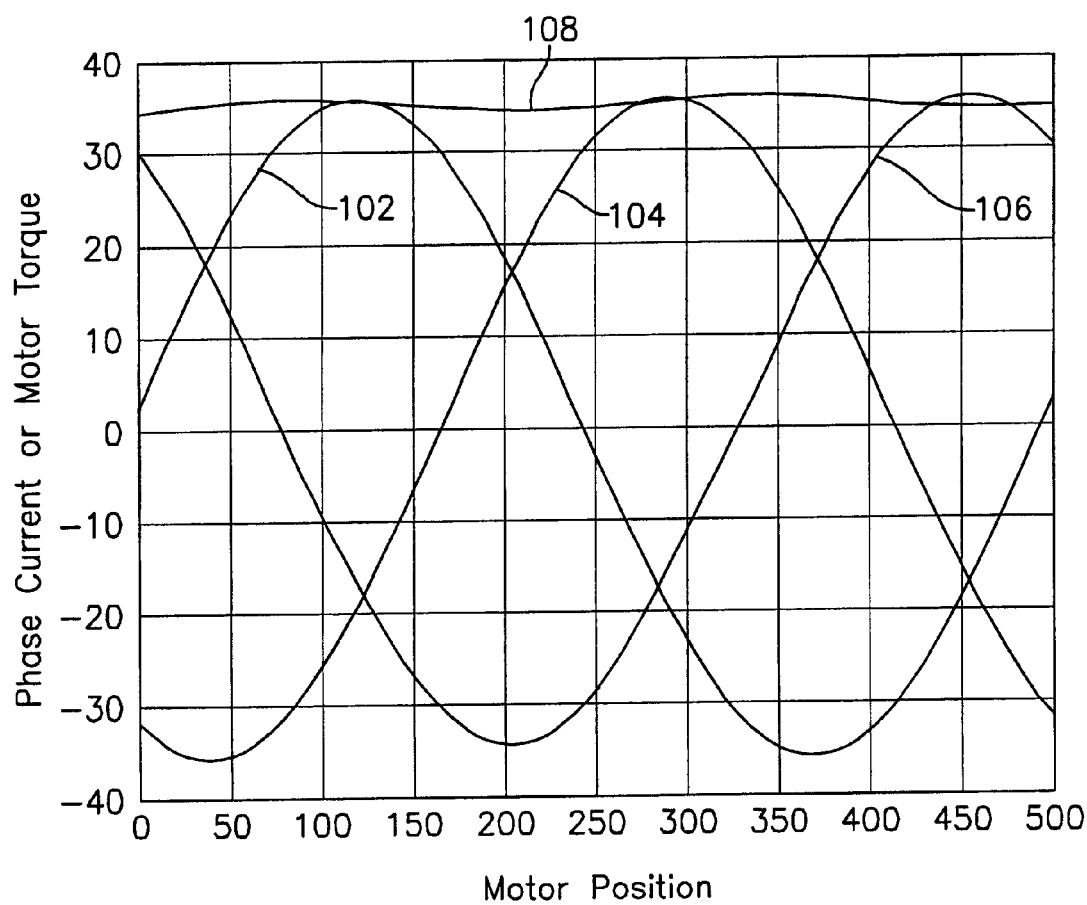
FIG. 3 is a graphical representation of a set of unbalanced phase currents and the corresponding motor torque.

This invention describes various methods for minimizing torque ripple produced by unbalanced phase currents in a sinusoidally excited permanent magnet ac motor (PMAC). Unbalanced phase currents are due primarily to resistance imbalances in the motor and controller. As an example of the problem addressed by this invention, a set of unbalanced three phase currents 102, 104, 106 with the corresponding motor torque 108 is shown in FIG. 3.

Figure 4:
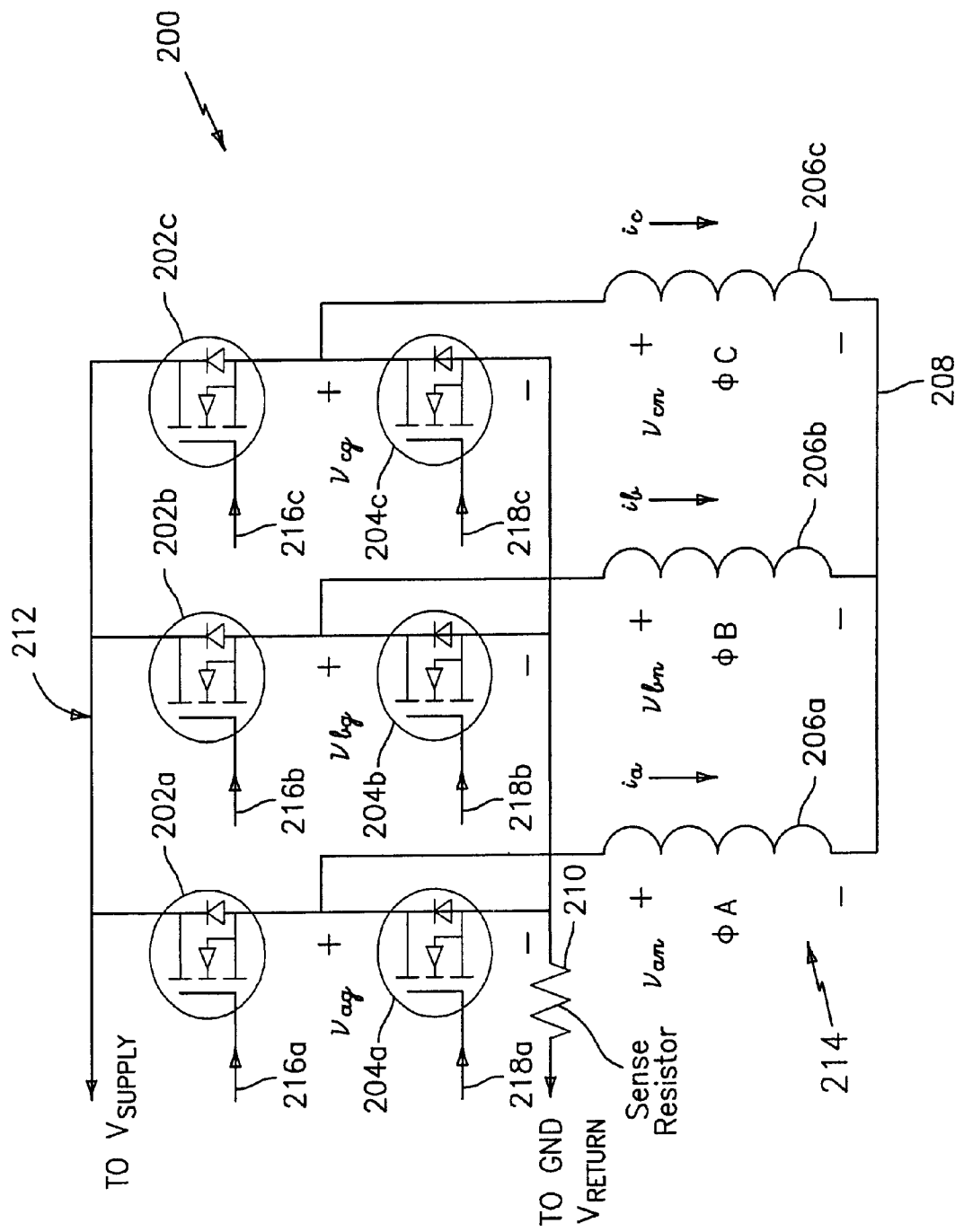
FIG. 4 is a schematic representation of the current and voltage conventions of the present invention.

The current and voltage conventions used in this invention are shown generally at 200 in FIG. 4. The voltage equations are written with respect to the neutral voltage:

$$\begin{bmatrix} v_{an}(t) \\ v_{bn}(t) \\ v_{cn}(t) \end{bmatrix} = \begin{bmatrix} r_a & 0 & 0 \\ 0 & r_b & 0 \\ 0 & 0 & r_c \end{bmatrix} \begin{bmatrix} i_a(t) \\ i_b(t) \\ i_c(t) \end{bmatrix} + \begin{bmatrix} L(\theta_r^e) & M(\theta_r^e) & M(\theta_r^e) \\ M(\theta_r^e) & L(\theta_r^e) & M(\theta_r^e) \\ M(\theta_r^e) & M(\theta_r^e) & L(\theta_r^e) \end{bmatrix} \qquad (1a)$$

$$\frac{d}{dt}\begin{bmatrix} i_a(t) \\ i_b(t) \\ i_c(t) \end{bmatrix} + \frac{d}{dt}\begin{bmatrix} L(\theta_r^e) & M(\theta_r^e) & M(\theta_r^e) \\ M(\theta_r^e) & L(\theta_r^e) & M(\theta_r^e) \\ M(\theta_r^e) & M(\theta_r^e) & L(\theta_r^e) \end{bmatrix}\begin{bmatrix} i_a(t) \\ i_b(t) \\ i_c(t) \end{bmatrix} + \begin{bmatrix} e_{an}(t) \\ e_{bn}(t) \\ e_{cn}(t) \end{bmatrix}$$

where $L(\theta_r^e)$ and $M(\theta_r^e)$ are the self and mutual inductances, respectively, and $r_a$, $r_b$, $r_c$ are the respective phase resistances. If the inductances are assumed to not vary significantly with rotor position then the derivatives in the inductive speed voltage term are zero and the simplified model becomes $$\begin{bmatrix} v_{an}(t) \\ v_{bn}(t) \\ v_{cn}(t) \end{bmatrix} = \begin{bmatrix} r_a & 0 & 0 \\ 0 & r_b & 0 \\ 0 & 0 & r_c \end{bmatrix} \begin{bmatrix} i_a(t) \\ i_b(t) \\ i_c(t) \end{bmatrix} + \begin{bmatrix} L & M & M \\ M & L & M \\ M & M & L \end{bmatrix}\frac{d}{dt}\begin{bmatrix} i_a(t) \\ i_b(t) \\ i_c(t) \end{bmatrix} + \begin{bmatrix} e_{an}(t) \\ e_{bn}(t) \\ e_{cn}(t) \end{bmatrix} \qquad (1b)$$

where $v_{an}$, $v_{bn}$, $v_{cn}$ are the motor phase line-to-neutral voltages and $e_{an}$, $e_{bn}$, $e_{cn}$ are the line-to-neutral generated voltages which are described as $$e_{an}(t) = \frac{d\theta_r}{dt} K_{V_{LN}}^e \sin(\theta_r^e) \qquad (2)$$

$$e_{bn}(t) = \frac{d\theta_r}{dt} K_{V_{LN}}^e \sin\left(\theta_r^e - \frac{2\pi}{3}\right) \qquad (3)$$

$$e_{cn}(t) = \frac{d\theta_r}{dt} K_{V_{LN}}^e \sin\left(\theta_r^e + \frac{2\pi}{3}\right) \qquad (4)$$

where $K_{V_{LN}}^e$ is the magnitude of the line-to-neutral generated voltage in electrical radians per second. For a particular set of controller output voltages, $v_{ag}$, $v_{bg}$, $v_{cg}$, there will be a corresponding set of phase currents $i_a$, $i_b$, $i_c$ produced which satisfy Eqn. 1b. The instantaneous motor torque may be written as a function of the rotor position in electrical degrees $\theta_r^e$ for an arbitrary set of phase currents at a given time instant t as $$T(t, \theta_r^e) = \frac{P}{2} K_{V_{LN}}^e \left( i_a(t)\sin(\theta_r^e) + i_b(t)\sin\left(\theta_r^e - \frac{2\pi}{3}\right) + i_c(t)\sin\left(\theta_r^e + \frac{2\pi}{3}\right) \right) \qquad (5)$$

where it is assumed that the motor does not exhibit magnetic saturation characteristics and that the generated voltage characteristics are perfectly sinusoidal. For analysis purposes, the phase currents may also be written as a function of rotor position. For the moment the high frequency voltage harmonics from the controller will be neglected and the assumption will be made that the applied line-to-line voltage is sinusoidal. The torque in Eqn. 5 for an arbitrary unbalanced current condition becomes $$T(\theta_r^e) = \frac{P}{2} K_{V_{LN}}^e (I + \Delta I_a)\sin(\theta_r^e + \alpha_a)\sin(\theta_r^e) + \ldots \qquad (6)$$

$$\frac{P}{2} K_{V_{LN}}^e (I + \Delta I_b)\sin\left(\theta_r^e - \frac{2\pi}{3} + \alpha_b\right)\sin\left(\theta_r^e - \frac{2\pi}{3}\right) + \ldots$$

$$\frac{P}{2} K_{V_{LN}}^e (I + \Delta I_c)\sin\left(\theta_r^e + \frac{2\pi}{3} + \alpha_c\right)\sin\left(\theta_r^e + \frac{2\pi}{3}\right)$$

where $\Delta I_a$, $\Delta I_b$, $\Delta I_c$, $\alpha_a$, $\alpha_b$, and $\alpha_c$ are constants representing the unbalanced phase currents. For balanced operation the following conditions apply $$\Delta I_a = \Delta I_b = \Delta I_c = 0 \quad (7a)$$

$$\alpha_a = \alpha_b = \alpha_c = \alpha \quad (7b)$$

Using trigonometric identities, the torque in Eqn. 6 for balanced conditions simplifies to $$T(I, \alpha) = \frac{3}{2}\left(\frac{P}{2}\right)K^e_{V_{LN}}I\cos(\alpha) \quad (8)$$

where torque is not a function of position but only of the current magnitude I and phase angle $\alpha$. Recalling the previous idealized assumptions, this indicates that there is no torque ripple for a balanced sinusoidal motor drive system.

When there is an arbitrary unbalanced condition such that Eqns. 7a and 7b do not hold then the motor torque becomes the sum of two components. The first component depends on the current magnitudes and phase angles. The second component is a function of current magnitudes, phase angles and motor position:

$$T(I, \alpha, \theta^e_r) = \quad (9)$$

$$\frac{P}{4}K^e_{V_{LN}}[(I + \Delta I_a)\cos(\alpha_a) + (I + \Delta I_b)\cos(\alpha_b) + (I + \Delta I_c)\cos(\alpha_c)] +$$

$$\ldots - \frac{P}{4}K^e_{V_{LN}}\left[(I + \Delta I_a)\cos(2\theta^e_r + \alpha_a) + \right.$$

$$\left.(I + \Delta I_b)\cos\left(2\theta^e_r - \frac{4\pi}{3} + \alpha_b\right) + (I + \Delta I_c)\cos\left(2\theta^e_r + \frac{4\pi}{3} + \alpha_c\right)\right]$$

The second component in Eqn. 9, which contains the position dependency, is the sum of three sinusoids each of which has a frequency of twice the motor electrical frequency. Recalling that the sum of a set of sinusoids of equal frequency yields another sinusoid at that same frequency, the current imbalance condition produces a torque ripple component that is twice the electrical frequency. However, the magnitude of the torque ripple is a complicated function of the current imbalance parameters $\Delta I_a$, $\Delta I_b$, $\Delta I_c$, $\alpha_a$, $\alpha_b$, and $\alpha_c$. The next section will derive an equivalent circuit model that will simplify the analysis of unbalanced currents.

Referring to FIG. 4, an inverter 212 controls the line-to-line voltages $v_{ab}$, $v_{bc}$, $v_{ca}$ by modifying the line-to-ground voltages $v_{ag}$, $v_{bg}$, $v_{cg}$, (note that with unbalanced operation a simple ground-to-neutral constant voltage offset relationship is not valid). Equation 1 written in terms of line-to-line voltages becomes $$\begin{bmatrix} v_{ab} \\ v_{bc} \\ v_{ca} \end{bmatrix} = \begin{bmatrix} r_a & -r_b & 0 \\ 0 & r_b & -r_c \\ -r_a & 0 & r_c \end{bmatrix}\begin{bmatrix} i_a \\ i_b \\ i_c \end{bmatrix} + \quad (10)$$

$$\begin{bmatrix} L-M & M-L & 0 \\ 0 & L-M & M-L \\ M-L & 0 & L-M \end{bmatrix}\frac{d}{dt}\begin{bmatrix} i_a \\ i_b \\ i_c \end{bmatrix} + \begin{bmatrix} e_{ab} \\ e_{bc} \\ e_{ca} \end{bmatrix}$$

where the inverter line-to-ground voltages are related to the line-to-line voltages as $$\begin{bmatrix} v_{ab} \\ v_{bc} \\ v_{ca} \end{bmatrix} = \begin{bmatrix} 1 & -1 & 0 \\ 0 & 1 & -1 \\ -1 & 0 & 1 \end{bmatrix}\begin{bmatrix} v_{ag} \\ v_{bg} \\ v_{cg} \end{bmatrix} \quad (11)$$

The matrices in Eqn. 10 have a rank of two and consequently are not invertible. In the following derivation it will be necessary to compute the inverse of matrices describing the electrical dynamics of the inverter 212 and motor 214.

Recall that sum $v_{ab}+v_{bc}+v_{ca}$ is identically equal to zero (from a KVL loop around the motor terminals) and $i_a+i_b+i_c$ is identically equal to zero because of the wye motor connection 214. Thus Eqn. 10 may be row and column reduced to an equivalent second order system as $$\begin{bmatrix} v_{ab} \\ v_{bc} \end{bmatrix} = \begin{bmatrix} r_a & -r_b \\ r_c & r_b+r_c \end{bmatrix}\begin{bmatrix} i_a \\ i_b \end{bmatrix} + \begin{bmatrix} L-M & M-L \\ L-M & 2(L-M) \end{bmatrix}\frac{d}{dt}\begin{bmatrix} i_a \\ i_b \end{bmatrix} + \begin{bmatrix} e_{ab} \\ e_{bc} \end{bmatrix} \quad (12)$$

where $v_{ca}$ and $i_c$ are solved from the relationships $v_{ab}+v_{bc}+v_{ca}=0$ and $i_a+i_b+i_c=0$. The inverter output voltages $v_{ag}$, $v_{bg}$, $v_{cg}$, are found by solving Eqn. 11. However, recall that Eqn. 11 has a matrix rank of 2 and consequently admits a non-unique solution. In practice the solution of Eqn. 11 is constrained by the controller modulation technique (e.g., triplen harmonics, phase grounding) and that the instantaneous controller output voltage must range between zero volts and the dc link supply voltage $V_{supply}$. The general form of Eqn. 12 may be written in matrix format as $$V_{abc} = R_{abc}I_{ab} + L_{ab}\frac{d}{dt}I_{ab} + E_{abc} \quad (13)$$

where a bold font with an abc subscript indicates a matrix variable.

The phase resistance variation $\Delta R$ from the nominal resistance $\bar{R}$ is related to the actual phase resistance as $$r_a = \bar{r} + \Delta r_a \quad (14a)$$

$$r_b = \bar{r} + \Delta r_b \quad (14b)$$

$$r_c = \bar{r} + \Delta r_c \quad (14c)$$

$$R_{abc} = \begin{bmatrix} \bar{r}+\Delta r_a & -\bar{r}-\Delta r_b \\ \bar{r}+\Delta r_c & 2\bar{r}+\Delta r_b+\Delta r_c \end{bmatrix} = \begin{bmatrix} \bar{r} & -\bar{r} \\ \bar{r} & 2\bar{r} \end{bmatrix} + \begin{bmatrix} \Delta r_a & -\Delta r_b \\ \Delta r_c & \Delta r_b+\Delta r_c \end{bmatrix} \quad (15)$$

or in matrix form as $$R_{abc} = \bar{R} + \Delta R \quad (16)$$

and rewriting Eqn. 8 as $$V_{abc} = \bar{R}_{abc}I_{ab} + \Delta R_{abc}I_{ab} + L\frac{d}{dt}I_{ab} + E_{abc} \quad (17)$$

This formulation has the disadvantages that the matrices are not symmetric and the voltages are expressed as motor line-to-line variables.

The voltages and currents in Eqn. 1a are sinusoidal variables as a function of motor position. Park's transformation is often used to remove the position dependent variables and parameters. This transformation converts the electrical variables to a reference frame that rotates with the motor. The transformed motor Equation 1a becomes $$\begin{bmatrix} v_q \\ v_d \end{bmatrix} = \begin{bmatrix} \bar{r}+\Delta r_q & 0 \\ 0 & \bar{r}+\Delta r_d \end{bmatrix}\begin{bmatrix} i_q \\ i_d \end{bmatrix} + \begin{bmatrix} L_q & 0 \\ 0 & L_d \end{bmatrix}\frac{d}{dt}\begin{bmatrix} i_q \\ i_d \end{bmatrix} + \quad (18)$$

$$\omega^e_r\begin{bmatrix} 0 & L_d \\ -L_q & 0 \end{bmatrix}\begin{bmatrix} i_q \\ i_d \end{bmatrix} + \omega^e_r\begin{bmatrix} K^e_{V_{LN}} \\ 0 \end{bmatrix}$$

and the motor torque equation is $$T = \frac{3}{2}\left(\frac{P}{2}\right)K^e_{V_{LN}} i_q \tag{19}$$

where the subscript q refers to the rotor quadrature axis and the d subscript refers to the rotor direct axis. This is the most commonly used form of describing a permanent magnet ac motor. This formulation has the advantage that the matrices are symmetric and invertible. Also, the torque producing component of the motor current (q axis) has been decoupled from the non-torque producing current resulting in Eqn. 19 having the same structure as a dc motor. In addition, the position dependent inductances in Eqn. 1a become constants in the rotating reference frame and the simplifying assumptions in Eqn. 1b are not necessary. As a result, Eqn. 18 is a more accurate model of the electrical dynamics than Eqn. 17 in which the inductive speed voltage is neglected. However, the voltage and phase variables are abstract quantities and one must apply the inverse transformation to recover the phase currents and voltages. The transformed variables in Eqn. 18 are nonlinear and consequently most control analysis and synthesis theory becomes difficult to apply. In the following sections Eqn. 18 will be used in detecting current and resistance imbalance parameters.

A fictitious resistance $r_n$ from the motor wye point to the controller ground may be added. This wye-to-ground resistance is assumed to be much greater than the motor and controller line resistance. The resulting circuit equations become $$\begin{bmatrix} v_{ag} \\ v_{bg} \\ v_{cg} \end{bmatrix} = \begin{bmatrix} r_a+r_n & r_n & r_n \\ r_n & r_b+r_n & r_n \\ r_n & r_n & r_c+r_n \end{bmatrix}\begin{bmatrix} i_a \\ i_b \\ i_c \end{bmatrix} + \begin{bmatrix} L & M & M \\ M & L & M \\ M & M & L \end{bmatrix}\frac{d}{dt}\begin{bmatrix} i_a \\ i_b \\ i_c \end{bmatrix} + \begin{bmatrix} e_{an} \\ e_{bn} \\ e_{cn} \end{bmatrix} \tag{20}$$

where the current through the wye-to-ground resistance has been eliminated by the relationship $$i_n = i_a + i_b + i_c \tag{21}$$

Equation 20 has the advantage that the resistance and inductance matrices are invertible thereby eliminating the need for a matrix reduction operations or reference frame transformations. In addition, the voltages are expressed directly in terms of a linear relationship with the controller output voltages so that it is not necessary to solve Eqn. 11 as in the case of line-to-line voltage variables. The error introduced by the wye-to-ground resistance is negligible for analysis purposes since it is typically set greater than one thousand times the controller and motor resistance. Of particular convenience for the following derivation, the resistance variation matrix $\Delta R$ is diagonal:

$$R = \begin{bmatrix} \bar{r}_a+r_n & r_n & r_n \\ r_n & \bar{r}_b+r_n & r_n \\ r_n & r_n & \bar{r}_c+r_n \end{bmatrix} + \begin{bmatrix} \Delta r_a & 0 & 0 \\ 0 & \Delta r_b & 0 \\ 0 & 0 & \Delta r_c \end{bmatrix} \tag{22}$$

$$R = \bar{R} + \Delta R \tag{23}$$

Using a slightly more compact notation, Eqn. 20 may be written in matrix format using Eqn. 23 in a manner similar to Eqn. 13 as $$V_g = \bar{R}I_{abc} + \Delta R I_{abc} + L\frac{d}{dt}I_{abc} + E_n \tag{24}$$

Because of the above listed advantages, Eqn. 24 will be used throughout this invention when it is important to describe the system in machine variables as an alternative to the reference frame transformed variables of Eqn. 18.

The classical approach to unbalanced three phase circuit analysis is to rewrite Eqn. 24 in terms of phasors as $$(V_g - E_n) = (\bar{R} + \Delta R + j\omega L)I_{abc} \tag{24a}$$

which is of the form of $$V_{abc} = Z_{abc} I_{abc} \tag{24b}$$

A change of coordinates is applied to Eqn. 24b which diagonalizes the impedance matrix Z:

$$V_{+-0} = A V_{abc} \tag{24c}$$

$$I_{+-0} = A I_{abc} \tag{24d}$$

Noting that the matrix inverse exists and substituting Eqn. 24c into Eqn. 24b yields $$V_{+-0} = A Z_{abc} A^{-1} I_{+-0} \tag{24e}$$

which is rewritten as $$V_{+-0} = Z_{+-0} I_{+-0} \tag{24f}$$

where the diagonal matrix has been denoted as $$Z_{+-0} = A Z_{abc} A^{-1} \tag{24g}$$

The columns of A are the eigenvectors of the balanced impedance matrix $Z_{abc}$. This transformation is usually defined for balanced conditions where $\Delta R$ is the zero matrix. When applied to the voltage and current variables of Eqns. 24e and 24f with the assumption of balanced conditions this results in a set of three decoupled circuit equations. These are referred to as the zero, positive and negative sequences, respectively, and collectively are called the symmetrical components of Eqn. 24a. In the case of a wye connected motor, the fictitious neutral resistance only appears in the zero sequence circuit for an arbitrary circuit imbalance. In the limit as $r_n$ is increased the zero sequence circuit becomes open and is thereafter neglected. When the transformation Eqn. 24e is now applied to an arbitrary unbalanced circuit Eqn. 24b the three phase circuit is decomposed into the solution of two separate circuit equations. For the case where $\Delta R$ has arbitrary time varying values on its diagonal, analysis using symmetrical components does not simplify the solution of Eqn. 24 and will not be used in the following discussion.

The resistance variation matrix $\Delta R$ may be considered as a perturbation of the nominal system that results in a variation of the motor current from a balanced condition. The resulting perturbation of the motor current from a nominal balanced condition will be denoted as $$\begin{bmatrix} i_a(t) \\ i_b(t) \\ i_c(t) \end{bmatrix} = \begin{bmatrix} \bar{i}_a(t) \\ \bar{i}_b(t) \\ \bar{i}_c(t) \end{bmatrix} + \begin{bmatrix} \Delta i_a(t) \\ \Delta i_b(t) \\ \Delta i_c(t) \end{bmatrix} \tag{25}$$

$$I_{abc}(t) = \bar{I}(t) + \Delta I(t) \tag{26}$$

where the overbar denotes the balanced three phase currents that would exist if $\Delta R$ was the zero matrix. The functional dependence on time has been explicitly written to emphasize that the previous analysis has been strictly in the time domain.

The controller creates a set of compensating voltages which will drive the current perturbation $\Delta I(t)$ to zero. The set of compensating voltages may also be expressed as a perturbation from a balanced set as $$\begin{bmatrix} v_{ag}(t) \\ v_{bg}(t) \\ v_{cg}(t) \end{bmatrix} = \begin{bmatrix} \bar{v}_{ag}(t) \\ \bar{v}_{bg}(t) \\ \bar{v}_{cg}(t) \end{bmatrix} + \begin{bmatrix} \Delta v_{ag}(t) \\ \Delta v_{bg}(t) \\ \Delta v_{cg}(t) \end{bmatrix} \quad (27)$$

$$V(t) = \bar{V}(t) + \Delta V(t) \quad (28)$$

where the overbar denotes a set of balanced three phase voltages. The elements of $\Delta V(t)$ will each be a sinusoidal voltage with the same fundamental frequency as $\bar{V}(t)$ and whose component magnitudes and phase angles may be independently controlled.

Substituting Eqns. 26 and 28 into Eqn. 24 gives a general description of the unbalanced operation of the motor and controller as $$\bar{V}(t) + \Delta V(t) = (\bar{R} + \Delta R)(\bar{I}(t) + \Delta I(t)) + L\frac{d}{dt}(\bar{I}(t) + \Delta I(t)) + E_n(t) \quad (29)$$

This is expanded and regrouped as $$\bar{V}(t) + \Delta V(t) = \left(\bar{R}\bar{I}(t) + L\frac{d}{dt}\bar{I}(t) + E_n(t)\right) + \left(\bar{R}\Delta I(t) + \Delta R\bar{I}(t) + \Delta R\Delta I(t) + L\frac{d}{dt}\Delta I(t)\right) \quad (30)$$

Recalling that $E_n(t)$ was assumed to be a set of balanced three phase voltages, the general unbalanced conditions Eqn. 30 may be decomposed into a balanced nominal component $$\bar{V}(t) = \bar{R}\bar{I}(t) + L\frac{d}{dt}\bar{I}(t) + E_n(t) \quad (31)$$

and an unbalanced component $$\Delta V(t) = \bar{R}\Delta I(t) + \Delta R\bar{I}(t) + \Delta R\Delta I(t) + L\frac{d}{dt}\Delta I(t) \quad (32)$$

Because the motor equivalent circuit of Eqn. 30 is a linear system, a superposition argument may be made that Eqns. 31 and 32 may be considered separately. In the following discussion the motor and controller shall operate in a conventional manner described by Eqn. 31 with the error dynamics modeled by Eqn. 32 for the case where a resistance perturbation exists. The complete solution is then found by adding Eqns. 31 and 32.

Figure 5:
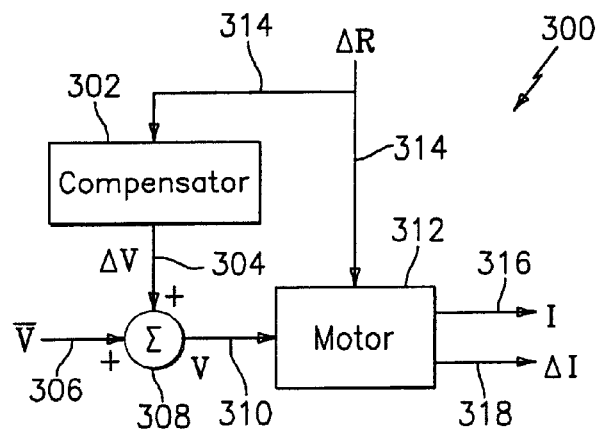
FIG. 5 is a schematic representation of feed forward control system.

The interaction of the motor and controller has two general structures. The first is a feedforward approach based on direct measurement of $\Delta R$. A block diagram of this approach is shown in FIG. 5. The second approach is a feedback structure based on measurement of $\Delta I(t)$. A block diagram is shown in FIG. 6.

Figure 6:
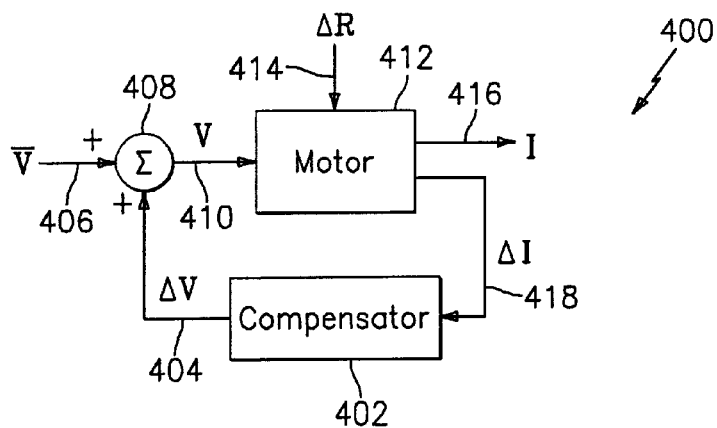
FIG. 6 is a schematic representation of a feed back control system.
Figure 9:
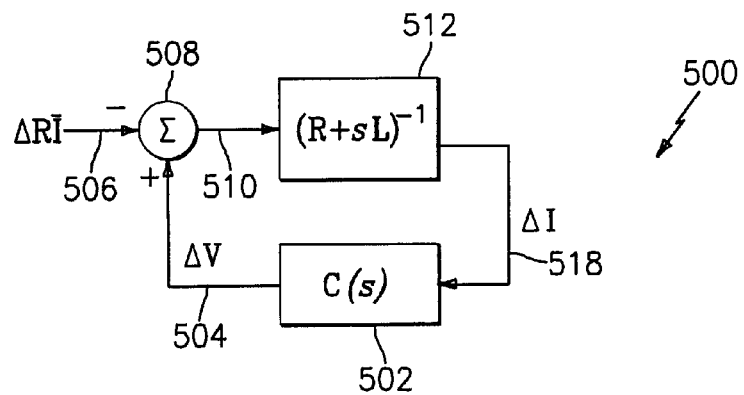
FIG. 9 is a schematic representation of a feed back control system.

This invention describes various options for defining the compensators shown in FIGS. 5 and 6. In general, the techniques range from those which require complex signal and algorithms with nearly perfect cancellation of $\Delta I(t)$ to decreasing levels of complexity at the expense of degraded $\Delta I(t)$ cancellation. The remaining discussion will depart from the time domain descriptions of Eqns. 30, 31 and 32 in order to support the derivation of the compensators 302, 402 shown in FIGS. 5 and 6.

In most high performance applications, the PMAC and power electronic drive operate as a torque servo. As such, the motor drive rarely reaches a state of constant frequency operation. Traditionally, permanent magnet ac motor drives are analyzed by phasor diagrams which are valid only at sinusoidal steady-state (constant frequency) conditions. This is generally a useful design approach because the electrical dynamics are much faster than the mechanical dynamics of most servomechanisms. However, to conform with traditional feedback control nomenclature and to emphasize that the compensators 302, 402 shown in FIGS. 5 and 6 do not in practice operate under quasi-static constant frequency conditions, Eqns. 30–32 will be transformed using the Laplace operator s. When convenient, $j\omega$ will be substituted to denote phasor quantities for constant frequency operation. consequently, Eqns. 30–32 become $$\bar{V}(s) + \Delta\bar{V}(s) = (\bar{R}\bar{I}(s) + Ls\bar{I}(s) + E_n(s)) + (\bar{R}\Delta I(s) + \Delta R\bar{I}(s) + \Delta R\bar{I}(s) + Ls\Delta I(s))\text{tm} \quad (33)$$

$$\bar{V}(s) = \bar{R}\bar{I}(s) + Ls\bar{I}(s) + E_n(s) \quad (34)$$

$$\Delta V(s) = \bar{R}\Delta I(s) + \Delta R\bar{I}(s) + \Delta R\Delta I(s) + Ls\Delta I(s) \quad (35)$$

The perturbation dynamics of Eqn. 35 are solved for $\Delta I(s)$ using Eqn. 23 and the conventional rules for matrix algebra:

$$\Delta I(s) = (R+sL)^{-1}(\Delta V(s) - \Delta R\bar{I}(s)) \quad (36)$$

The purpose of the compensator is to force $\Delta I(s)$ to zero.

A direct measurement of the individual phase resistances is available and information regarding $\bar{I}(s)$ is derived from bus current and position sensor measurements, it follows by inspection of Eqn. 36 that setting the compensating voltages as $$\Delta V(s) = \Delta R\bar{I}(s) = \begin{bmatrix} \Delta r_a \bar{I}_A(j\omega) \\ \Delta r_b \bar{I}_B(j\omega) \\ \Delta r_c \bar{I}_C(j\omega) \end{bmatrix} \quad (37)$$

will drive the current imbalance vector to zero. $\bar{I}(s)$ is derived by the controller in order to support the separate requirements for the current reasonableness diagnostic. The bus current is measured from the voltage drop across the bus resistor shown in FIG. 4. Recall that information regarding the motor phase currents is derived from a single sensing element and therefore avoids the errors associated with separate sensing elements for each phase. In Eqn. 37 the individual components have been written in terms of the balanced motor current phasors. For example, $\bar{I}_A(j\omega)$ is a complex number with an associated magnitude and phase angle for a given electrical frequency $\omega$. However, there will be a persistent $\Delta I(s)$ due to measurement errors in $\Delta R$ and $\bar{I}(s)$ and because of limitations in adjusting the controller output voltage magnitude and angle resolution.

Figure 7:
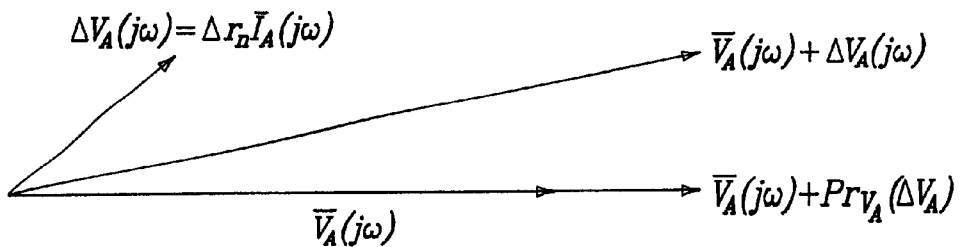
FIG. 7 is a first phasor diagram of the magnitude of the magnitude of $\Delta V(s)$ as the projection of $\Delta R\bar{I}(s)$ onto $\bar{V}(s)$.

Simplification may be had by adjusting the magnitude of $\Delta V(s)$ as the projection of $\Delta R\bar{I}(s)$ onto $\bar{V}(s)$. Using a phasor representation of a phase A, the projection is defined as seen in FIG. 7, where $\Delta V_A(j\omega)$ is the first element of the vector computed in Eqn. 37 and $\text{Pr}_{\bar{V}_A}(\Delta V_A)$ is the projection of $\Delta V_A$ onto $\bar{V}_A(j\omega)$. The control law for $\Delta V(s)$ becomes $$\Delta V(s) = Pr_{\overline{V}}(\Delta R\overline{I}(s)) = \begin{bmatrix} Pr_{\overline{V}_A}(\Delta r_a \overline{I}_a(j\omega)) \\ Pr_{\overline{V}_B}(\Delta r_b \overline{I}_b(j\omega)) \\ Pr_{\overline{V}_C}(\Delta r_c \overline{I}_c(j\omega)) \end{bmatrix} \quad (38)$$

This method reduces the resistance imbalance induced torque ripple to less than 33 percent of what it would be without modifying $\Delta V(s)$. This method is easier to implement than Eqn. 37 since only the magnitude of the controller output voltage is modified.

Figure 8:
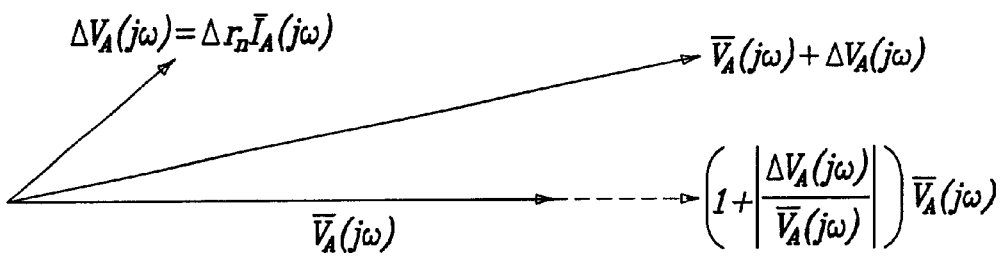
FIG. 8 is a second phasor diagram of the magnitude of the magnitude of $\Delta \bar{V}(s)$ as the projection of $\Delta R\bar{I}(s)$ onto $\bar{V}(s)$.

Simplification may be had by using only the magnitude of $\Delta R\overline{I}(s)$ in determining $\Delta V(s)$. This results in a control law that only requires a change in magnitude of the elements of $V(s)$ in response to the compensating terms in $\Delta V(s)$. These relationships are shown in FIG. 8 for phase A. The compensating voltage $\Delta V(s)$ is computed as $$\Delta V(s) = \begin{bmatrix} \Delta r_a |\overline{I}_a(j\omega)| |\overline{V}_A(j\omega)|^{-1} \overline{V}_A(j\omega) \\ \Delta r_b |\overline{I}_b(j\omega)| |\overline{V}_B(j\omega)|^{-1} \overline{V}_B(j\omega) \\ \Delta r_c |\overline{I}_c(j\omega)| |\overline{V}_C(j\omega)|^{-1} \overline{V}_C(j\omega) \end{bmatrix} \quad (39)$$

where the vertical bars denote the magnitude of the phasor quantity. This method reduces the resistance imbalance induced torque ripple to less than 40 percent of what it would be without modifying $\Delta V(s)$.

The compensator should minimize the magnitude of the closed loop transfer function between the resistance disturbance input $\Delta R\overline{I}$ and the output torque ripple associated with $\Delta I$. This transfer function is $$G(s) = ((R+sL)^{-1} - I_{3 \times 3})^{-1} C(s)(R+sL)^{-1} \quad (40)$$

In order to simplify the matrix notation, the following is defined:

$$W(s) = (R+sL)^{-1} \quad (41)$$

such that Eqn. 40 becomes $$G(s) = (W(s)C(s) - I_{33})^{-1} W(s) \quad (42)$$

and it is desired that the compensator minimize the $H_\infty$ norm of the stable transfer function $G(s)$ $$\|G(s)\|_\infty \leq \gamma \quad (43a)$$

where $\gamma$ is a scalar for the suboptimal minimization of the norm of $G(s)$. The scalar $\gamma$ is an imbalance torque ripple performance objective selected to ensure acceptable torque ripple characteristics over the operating velocity range of the motor. For MIMO systems the $H_\infty$ norm of the stable transfer function $G(s)$ is $$\|G(s)\|_{2\delta} = \sup_{0 < \omega < \infty} \overline{\sigma}[G(j\omega)] \quad (43b)$$

where $\overline{\sigma}(G)$ denotes the maximum singular value of $G$ at a particular frequency $j\omega$. There are several possible compensator design techniques which could be used in solving Eqns. 43a and 43b. The control law that will be initially considered for $\Delta V(s)$ has the form $$\Delta V(s) = -I_{3 \times 3} K(s)(\overline{R} + sL)\Delta I(s) \quad (44)$$

where $K(s)$ is a member of the set H of all real, proper, linear time-invariant (LTI) controllers. $\Delta I(s)$ is the $H_\infty$ performance variable to be minimized. $K(s)$ is selected to satisfy the suboptimal constraint $\gamma$. The structure of Eqn. 44 is motivated by solving Eqn. 35 for $\Delta R\overline{I}$ in the open loop condition as $$\Delta R\overline{I}(s) = -\overline{R}\Delta I(s) - Ls\Delta I(s) - \Delta R(s) \quad (45)$$

and using the perfect compensation derived in Eqn. 37 while neglecting $\Delta R\Delta I(s)$ since this term is always small for the imbalances seen in practice.

As mentioned previously, information regarding the motor phase current errors $\Delta I(s)$ in Eqn. 44 is derived from a single sensing element. Consequently, $\Delta I(s)$ is an inherently accurate measurement of the current imbalance and eliminates the difficulty of precise gain and bias matching of separate sensor amplifier circuits. See for instance A. M. Cross, P. D. Evans and A. J. Forsyth, "DC Link Current In PWM Inverters With Unbalanced and Nonlinear Loads," IEEE Proceedings on Electric Power Applications, Vol. 146, No. 6, 1999.

This compensator will achieve the requirements of Eqn. 43 within the limitations of the control module to measure the magnitude and angle of the current error vector $\Delta I(s)$ and the accuracy of the nominal resistance estimate $\overline{R}$ as part of the parameter compensation routine. In addition, $\gamma$ must also be large enough to account for the limited resolution of the voltage angles in $\Delta V(s)$ provided by the controller and the resolution of the measured frequency (motor velocity).

An alternative to Eqn. 44, which may be suitable if $\gamma$ is sufficiently large, is to compensate for resistance imbalances at relatively low frequencies and thereby neglect the inductance term in Eqn. 39. This results in $$\Delta V(s) = -I_{3 \times 3} K(s) \overline{R} \Delta I(s) \quad (46)$$

This compensator has the advantage of being significantly more robust than Eqn. 44 because errors in $\overline{R}$ will not cause phase angle errors in the compensating voltage vector $\Delta V(s)$. Consequently, good torque ripple minimization is achieved by a simplified control law (i.e., $\overline{R}$ could be set to a constant) given that the current error vector $\Delta I(s)$ magnitudes and angles are accurate. As above, $\gamma$ must be large enough to account for the limited resolution of the voltage angles in $\Delta V(s)$.

Figure 10:
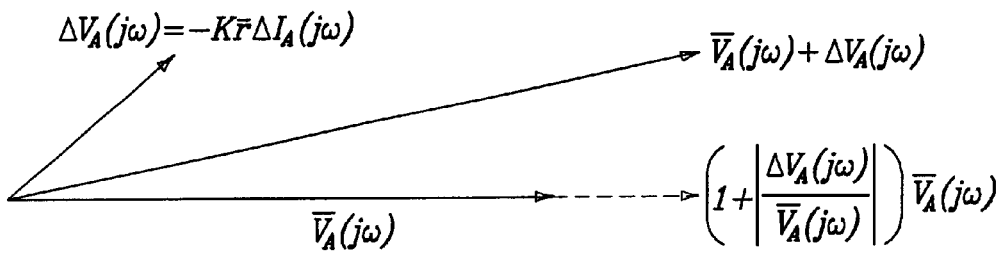
FIG. 10 is a third phasor diagram of the magnitude of the magnitude of $\Delta \bar{V}(s)$ as the projection of $\Delta R\bar{I}(s)$ onto $\bar{V}(s)$.

Further simplification may be had by employing the projection operator introduced above. The phasor diagram is shown in FIG. 10. The control law for the compensating voltage is $$\Delta V(s) = Pr_{\overline{V}}(-I_{3 \times 3} K(s) \overline{R} \Delta I(s)) = \begin{bmatrix} Pr_{\overline{V}_A}(-K(j\omega)\overline{r}\Delta I_a(j\omega)) \\ Pr_{\overline{V}_B}(-K(j\omega)\overline{r}\Delta I_b(j\omega)) \\ Pr_{\overline{V}_C}(-K(j\omega)\overline{r}\Delta I_c(j\omega)) \end{bmatrix} \quad (47)$$

Figure 11:
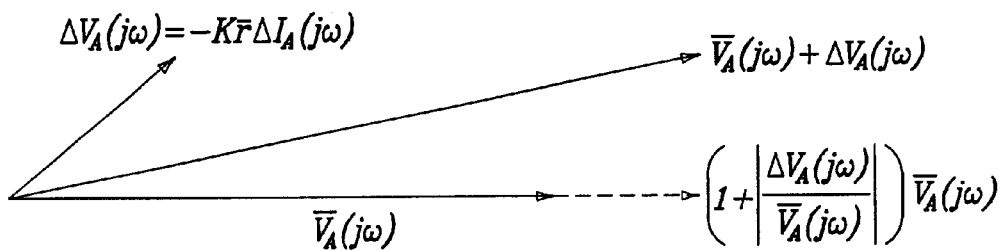
FIG. 11 is a fourth phasor diagram of the magnitude of the magnitude of $\Delta \bar{V}(s)$ as the projection of $\Delta R\bar{I}(s)$ onto $\bar{V}(s)$.
Figure 12:
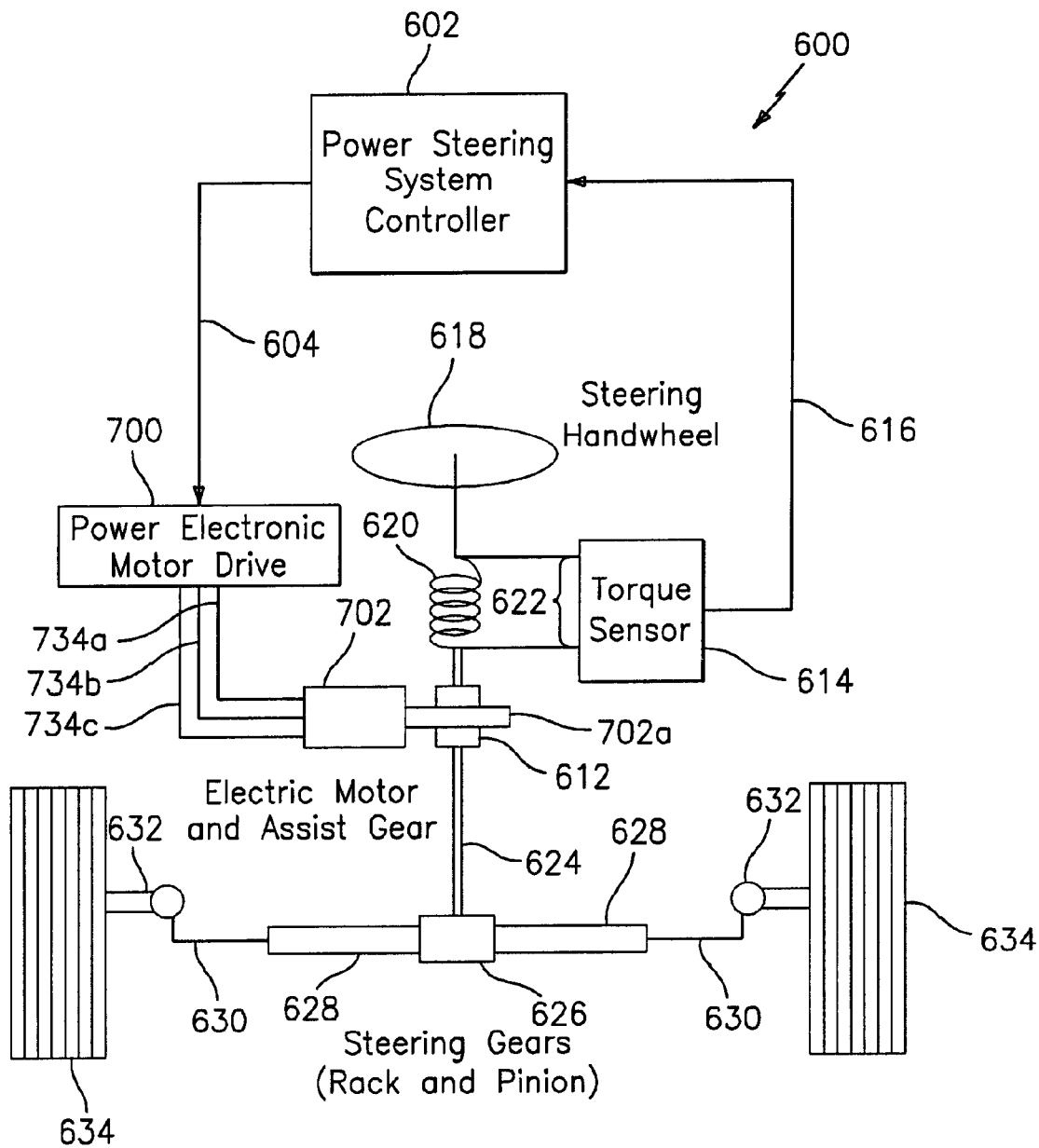
FIG. 12 is a schematic representation of an electric power steering system.

In a further refinement, the magnitudes of the controller voltage are modified as the summing the magnitude of the correction voltage of Eqn. 46. The phasor diagram for phase A is shown in FIG. 11. The compensating voltage is $$\Delta V(j\omega) = \begin{bmatrix} -K(j\omega)\Delta I_a(j\omega)|\overline{V}_A(j\omega)|^{-1} \overline{V}_A(j\omega) \\ -K(j\omega)\Delta I_b(j\omega)|\overline{V}_B(j\omega)|^{-1} \overline{V}_B(j\omega) \\ -K(j\omega)\Delta I_c(j\omega)|\overline{V}_C(j\omega)|^{-1} \overline{V}_C(j\omega) \end{bmatrix} \quad (48)$$

where the vertical bars denote the magnitude of the phasor. This nonlinear compensator reduces the resistance imbalance induced torque ripple to less than 40 percent of what it would be without compensation ($\Delta V(s)$ equal to the zero vector). This method will be sufficient depending upon the maximum allowable value of γ that can be tolerated.

The inverter 212 output voltages $v_{ag}$, $v_{bg}$, $v_{cg}$ of FIG. 4 are constrained to range between a minimum of zero volts (ground) to a maximum value equal to the supply voltage, $V_s$. This invention assumes that the inverter 212 in FIG. 4 is operated in a switched mode manner that is well known to those experienced in motor control art. For example, a 20 kHz pulse width modulation scheme may be employed to apply 9 volts to each of the line-to-ground phases from a 12 volt supply by switching each inverter phase in a manner where the high side MOSFETs 202a, 202b, 202c are enhanced for 37.5 μs and alternately the low-side MOSFETs 204a, 204b, 204c are enhancing for 12.5 μs.

The matrices in Eqn. 10 have a rank of two and consequently are not invertible. This can also be observed by noting that the wye-connected motor 214 in FIG. 4 must satisfy Kirchoff's voltage law such that $v_{ab}+v_{bc}+v_{ca}$ is identically equal to zero. Therefore, once any two of the line-to-line voltages $v_{ab}$, $v_{bc}$, $v_{ca}$ are defined then the third is constrained by the first two. Consequently, Eqn. 11 has an infinite number of solutions and a particular set of line-to-line voltages may be obtained from many different line-to-ground voltages from the inverter circuit 212 of FIG. 4. A first choice for the line-to-ground voltages may be for example:

$$v_{ag} = (\text{Mod\_Idx}_a)\left(\frac{V_s}{2}\right)(\sin(\theta_r + \delta_a)) + \left(\frac{V_s}{2}\right) \quad (49a)$$

$$v_{bg} = (\text{Mod\_Idx}_b)\left(\frac{V_s}{2}\right)\left(\sin\left(\theta_r - \frac{2\pi}{3} + \delta_b\right)\right) + \left(\frac{V_s}{2}\right) \quad (49b)$$

$$v_{cg} = (\text{Mod\_Idx}_c)\left(\frac{V_s}{2}\right)\left(\sin\left(\theta_r + \frac{2\pi}{3} + \delta_c\right)\right) + \left(\frac{V_s}{2}\right) \quad (49c)$$

where $\text{Mod\_Idx}_x$ is referred to as the modulation index for the respective x=a, b, c phase which represents the desired magnitude of the inverter output line-to-ground voltage. $\text{Mod\_Idx}_x$ ranges from 0.00 to 1.00 as a fraction of the supply voltage $V_s$ as indicated in FIG. 4 and may be set independently for each phase. Phase angle offset variables are denoted by $\delta_a$, $\delta_b$, $\delta_c$ and are likewise adjustable as independent and controlled variables by the inverter 212. Using Eqns. 49a–49c the maximum line-to-line voltage occurs when $\text{Mod\_Idx}_x$ is equal to 1.00 for phases a,b, and c:

$$\max(v_{ab}) = \max(v_{ag}) - \max(v_{bg}) = \frac{\sqrt{3}}{2}V_s \approx 0.866V_s \quad (50)$$

However, the inverter 212 of FIG. 4 has a theoretical limit of $$\max(v_{ab}) = V_s \quad (51)$$

which is a 15% increase over the limit in Eqn. 50. One method of overcoming the restriction of Eqn. 50 is to deliberately add third harmonic multiples to the inverter 212 line-to-ground voltages, $v_{ag}$, $a_{bg}$, $v_{cg}$ as $$v_{ag} = \quad (52a)$$
$$(\text{Mod\_Idx}_a)\frac{2}{\sqrt{3}}\left(\frac{V_s}{2}\right)\left(\sin(\theta_r) + \frac{10}{48}\sin(3\theta_r) - \frac{1}{48}\sin(9\theta_r)\right) + \left(\frac{V_s}{2}\right)$$

$$v_{bg} = (\text{Mod\_Idx}_b)\frac{2}{\sqrt{3}}\left(\frac{V_s}{2}\right) \quad (52b)$$
$$\left(\sin\left(\theta_r - \frac{2\pi}{3}\right) + \frac{10}{48}\sin\left(3\left(\theta_r - \frac{2\pi}{3}\right)\right) - \frac{1}{48}\sin\left(9\left(\theta_r - \frac{2\pi}{3}\right)\right)\right) + \left(\frac{V_s}{2}\right)$$

$$v_{cg} = (\text{Mod\_Idx}_c)\frac{2}{\sqrt{3}}\left(\frac{V_s}{2}\right) \quad (52c)$$
$$\left(\sin\left(\theta_r + \frac{2\pi}{3}\right) + \frac{10}{48}\sin\left(3\left(\theta_r + \frac{2\pi}{3}\right)\right) - \frac{1}{48}\sin\left(9\left(\theta_r + \frac{2\pi}{3}\right)\right)\right) + \left(\frac{V_s}{2}\right)$$

It is observed that third and ninth harmonic components are all in phase with each other for a balanced system and will cancel when the line-to-line voltage is computed as in Eqn. 11. Equations. 52a–52c will produce a set of three phase sinusoidal voltages with $\max(v_{ab})=V_s$. However, since this is only true for balanced voltages where $\text{Mod\_Idx}_a=\text{Mod\_Idx}_b=\text{Mod\_Idx}_c$ and $\delta_a=\delta_b=\delta_c$. Therefore, this technique cannot be used for the general case where unbalanced voltages are needed and the individual modulation index and phase angle offset variable are not equal.

This invention uses an alternative technique to create an arbitrary set of unbalanced three phase voltages. It is based upon observing that the benefit of Eqns. 52a–52c is largely due to the cancellation of the common mode voltage component associated with the third harmonic multiples. It is found that if an arbitrary set of three phase voltages is defined by Eqns. 49a–49c, then the resulting common mode may be subtracted from each of the phases with a result whereby condition Eqn. 51 is met. This method is described by computing the minimized line-to-ground voltages as $$(v_{ag})_{\min} = (\text{Mod\_Idx}_a)\frac{2}{\sqrt{3}}\left(\frac{V_s}{2}\right)(\sin(\theta_r + \delta_a)) - \min(v_{ag}, v_{bg}, v_{cg}) \quad (53a)$$

$$(v_{bg})_{\min} = \quad (53b)$$
$$(\text{Mod\_Idx}_b)\frac{2}{\sqrt{3}}\left(\frac{V_s}{2}\right)\left(\sin\left(\theta_r - \frac{2\pi}{3} + \delta_b\right)\right) - \min(v_{ag}, v_{bg}, v_{cg})$$

$$(v_{cg})_{\min} = \quad (53c)$$
$$(\text{Mod\_Idx}_c)\frac{2}{\sqrt{3}}\left(\frac{V_s}{2}\right)\left(\sin\left(\theta_r + \frac{2\pi}{3} + \delta_c\right)\right) - \min(v_{ag}, v_{bg}, v_{cg})$$

where min(f,g,h) compares the instantaneous values of each function f,g, and h and returns the value of the function which is minimum. The collective execution of the function described by Eqns. 53a–53c is referred to as a Voltage Imbalance Commutator (VIC).

Figure 13:
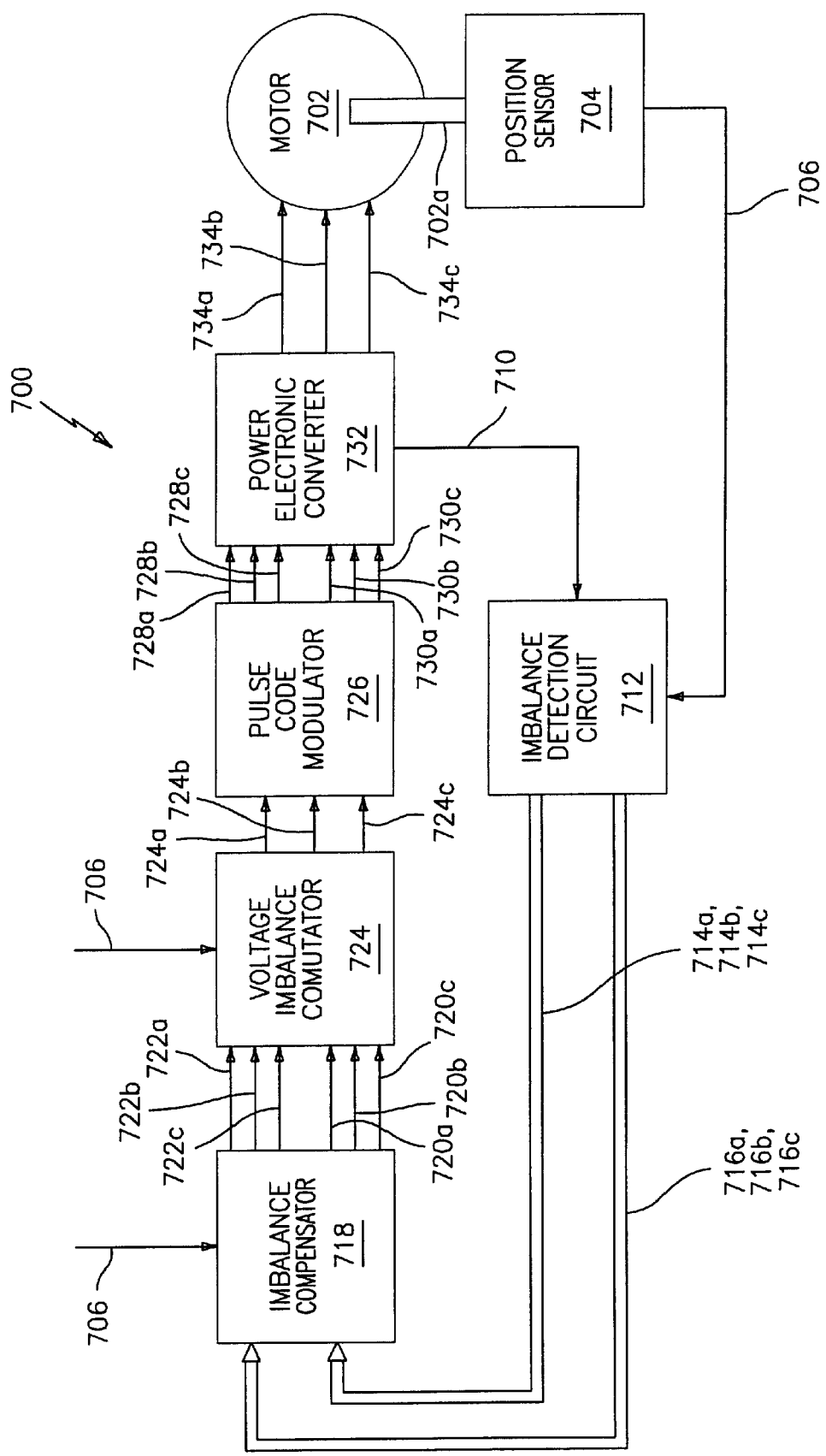
FIG. 13 is a schematic representation of a motor drive system of the present invention.

Referring to FIG. 13, an exemplary embodiment of this invention n a motor drive application is shown generally at 700. The three phase AC motor 702 includes a position transducer or sensor 704 which provides incremental motor position information 706. The motor position information, $\theta_r$, 706 is an integer S which indexes according to the motor position and direction. A sensor, such as the sense resistor 210 of FIG. 4, is provided to sequentially sample the phase currents 734 at convenient intervals providing thereby at least one motor phase current 710 that is synchronized with the motor position signal 706. The sensed motor phase current 710 and motor position 706 are applied to an imbalance detection circuit 712 that determines the magnitude and phase imbalances 714a, 714b, 714c, 716a, 716b, 716c associated with the measured phase current 710. In general, the phase angle imbalance 716a, 716b, 716c is not required for moderate levels of performance if a good quality measurement of the magnitude imbalance 714a, 714b, 714c is available. The magnitude imbalance information 714a, 714b, 714c and phase angle imbalance information 716a, 716b, 716c are applied to an imbalance compensator 718 that provides as output modulation index terms, Mod_Idx$_x$ 720a, 720b, 720c and phase angle offset variables $\delta_a$, $\delta_b$, $\delta_c$ 722a, 722b, 722c for reducing the aforesaid magnitude and phase angle imbalances 714a, 714b, 714c, 716a, 716b, 716c to an acceptable level. The modulation index terms and phase angle offset variables 720a, 720b, 720c, 722a, 722b, 722c are provided as input to a Voltage Imbalance Commutator (VIC) 724. The input to the VIC 724 is Mod_Idx$_a$, Mod_Idx$_b$, Mod_Idx$_c$ 720a, 720b, 720c and $\delta_a$, $\delta_b$, $\delta_c$ 722a, 722b, 722c. These signals 720a, 720b, 720c, 722a, 722b, 722c are operated upon as described in Eqns. 53a–53c by digital electronic circuits(not shown). The output of the VIC 724 is a set of three minimized line-to-ground voltage commands $(v_{ag})_{min}$, $(v_{bg})_{min}$, $(v_{cg})_{min}$, 724a, 724b, 724c that are typically represented by a digital number indicating a desired PWM duty cycle referenced to either the three high-side MOSFETs 202a, 202b, 202c or the three low-side MOSFETs 204a, 204b, 204c shown in FIG. 4. The output signals 724a, 724b, 724c of the VIC 724 are then processed and converted in a pulse code modulator such as a pulse width modulator 726. The pulse width modulator 726 provides as output a set of PWM gate commands 728a, 728b, 728c, 730a, 730b, 730c similar in nature to the gate commands 216a, 216b, 216c, 218a, 218b, 218c seen in FIG. 4. The PWM gate commands 728a, 728b, 728c, 730a, 730b, 730c are then applied to a power electronic inverter 732 similar to that shown at 212 in FIG. 4. The inverter 732 applies the phase currents 734a, 734b, 734c, such as the phase currents $i_a$, $i_b$, $i_c$ of FIG. 4, to the motor 702.

The VIC 724 may be realized using digital electronics in a number of different configurations. For example, the functions Eqns. 53a–53c maybe executed using a programmable device such as an embedded microcontroller or digital signal processor with PWM functions (e.g., TMS320C243 from Texas Instruments). Alternatively, Eqns. 53a–53c maybe executed using a programmable logic device (EPLD) or a field programmable gate array (FPGA) available from suppliers such as Altera and Xilinx.

Figure 14:
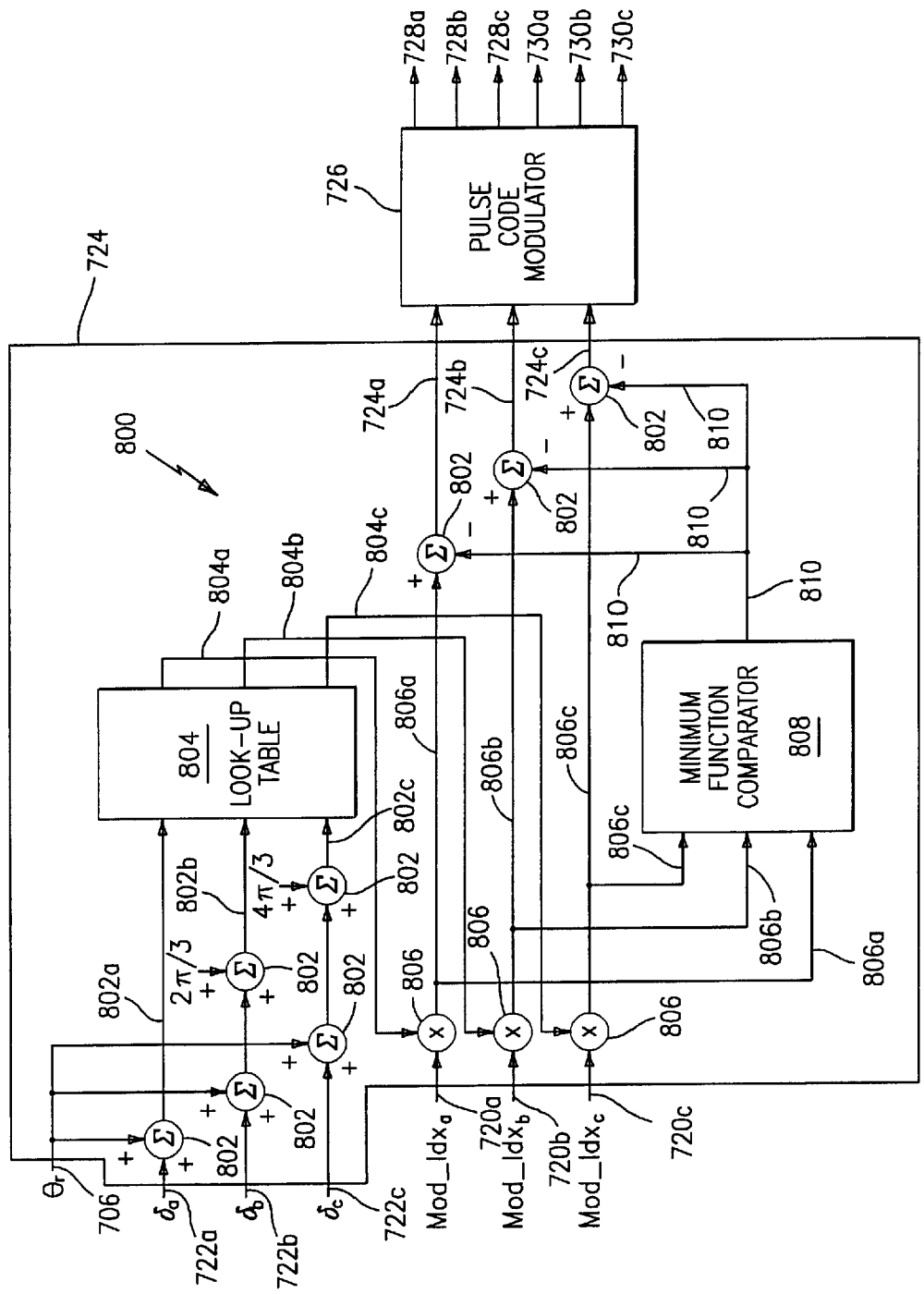
FIG. 14 is a schematic representation of a voltage imbalance commutator of FIG. 13.

Referring to FIG. 14, a signal flow for a digital circuit implementation of the VIC 724 is shown generally at 800. The phase angle offset correction terms 722a, 722b, 722c are represented as 2's complement integers and are added to the motor position angle 706 at a first set of summing junctions 802. The set of corrected phase angles are added at a second set of summing junctions 802 to respective 120/240 degree phase shifts ($2\pi/3$ rad, $4\pi/3$ rad) to obtain a set of corrected phase angles 802a, 802b, 802c. The set of corrected phase angles 802a, 802b, 802c are provided to a sine function look-up table 804 to provide the trigonometric sine thereof. The sine function look-up table 804 has a length that corresponds to the resolution of the incremental position information 706. In practice, the sine function look-up table 804 will have a greater number of entries than discrete position values in order to allow fine angle control of the phase angle offset variables $\delta_a$, $\delta_b$, $\delta_c$ 722a, 722b, 722c. For example, if the position counter (not shown) has 48 discrete values (7.5 degree resolution) the sine function look-up table 804 may have 576 entries to provide 0.625 degree increments to the phase angle offset variables $\delta_a$, $\delta_b$, $\delta_c$. In this case, the position counter would increment by 12 counts in the sine function look-up table 804 for each detected 7.5 degree transition. The outputs 804a, 804b, 804c of the sine function look-up table 804 are multiplied at a set of multipliers 806 by the respective modulation index terms Mod_Idx$_a$, Mod_Idx$_b$, and Mod_Idx$_c$ 720a, 720b, 720c generating thereby a set of line-to-ground voltage commands 806a, 806b, 806c. The modulation index terms 720a, 720b, 720c in general may be digital 2's complement signed numbers. The results of this multiplication, 806a, 806b, 806c, are sent to a minimum function comparator 808. The operation of the minimum function comparator 808 is executed by a sequence of logical compare operations (not shown) to determine which of the three inputs 806a, 806b, 806c has a minimum value based on signed 2's complement arithmetic. The minimum value, min($v_{ag}$, $v_{bg}$, $v_{cg}$), of the inputs to the minimum function comparator 808, is passed to the output 810 of the minimum function comparator 808 and is subtracted from the respective input 806a, 806b, 806c at a third set of summing junctions 802, again using 2's complement arithmetic. The results of the subtraction operations yields the set of minimized line-to-ground voltages $(v_{ag})_{min}$, $(v_{bg})_{min}$, $(v_{cg})_{min}$ 724a, 724b, 724c which are then processed by the pulse width modulator 726 which creates a set of gate signals 728a, 728b, 728c, 730a, 730b, 730c for modulating the inverter 732 line-to-ground voltages $v_{ag}$, $v_{bg}$, $v_{cg}$ at 734a, 734b, 734c. The set of gate signals 728a, 728b, 728c, 730a, 730b, 730c are in the nature of signals 216a, 216b, 216c, 218a, 218b, 218c of FIG. 4.

Figure 16:
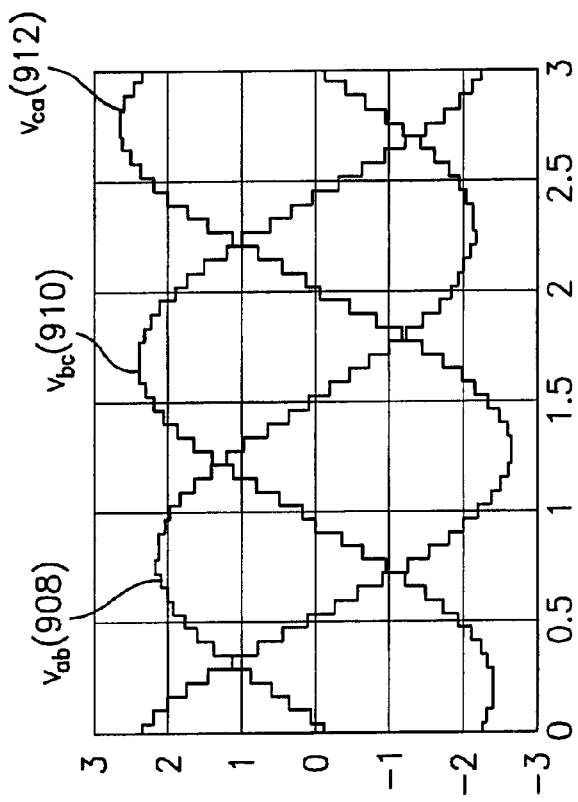
FIG. 16 is a second graphical representation of simulation results of a set of unbalanced phase voltages.
Figure 15:
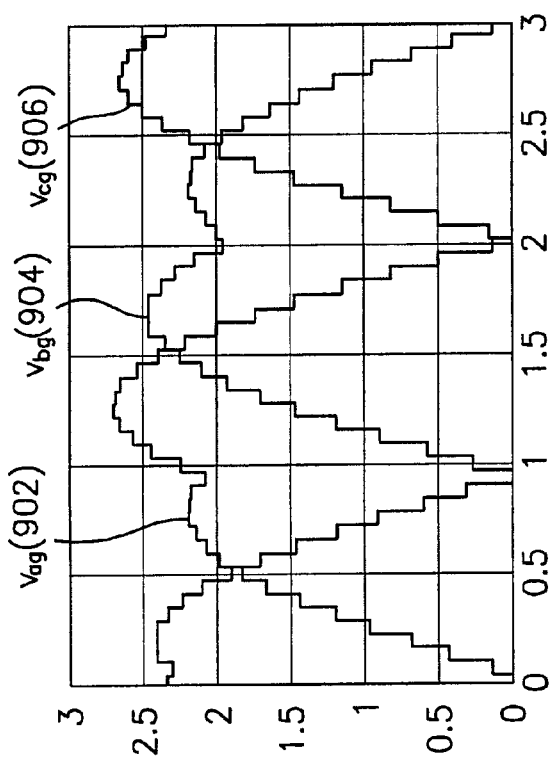
FIG. 15 is a first graphical representation of simulation results of a set of unbalanced phase voltages.

Simulation results for a set of unbalanced three phase line-to-ground voltages $v_{ag}$, $v_{bg}$, $v_{cg}$ are shown in FIG. 15 at 902, 904, 906. In this case there is incremental motor position information every 7.5 electrical degrees and the voltage magnitude has a 10-bit pulse width modulation resolution. In this example Mod_Idx$_a$=1.0, Mod_Idx$_b$=0.8 and Mod_Idx$_c$=1.2 and there is no phase angle offset term. The corresponding line-to-line voltages $v_{ab}$, $v_{bc}$, $v_{ca}$ are shown in FIG. 16 at 908, 910, 912 where it is noted that $v_{ab}<v_{bc}<v_{ca}$ as expected from the PWM gate commands 728a, 728b, 728c, 730a, 730b, 730c. It is observed that the resulting line-to-line voltages $v_{ab}$, $v_{bc}$, $v_{ca}$ 908, 910, 912 are sinusoidal with the desired unbalanced characteristics.

The following is a description of the imbalance detector 712 and imbalance compensator 718. It may be assumed that the bus current measurement signal 710 and motor position signal 706 are available. The purpose of the imbalance detector 712 and imbalance compensator 718 is to compute the modulation index terms 720a, 720b, 720c. For simplicity and without loss of generality, it may be assumed that voltage phase angle offset variables 722a, 722b, 722c are set equal to zero.

The imbalance compensator 718 measures the dc link current through a resistor such as the resistor 210 in FIG. 4 as taught by Parasiliti, et al ("Low cost current sensing in DSP based AC drives," Proceedings of ISIE 1999). The instantaneous motor phase current, $i_q$, 710 may be found by sampling the bus current signal 734 at 60 electrical degree intervals and assigning a particular phase to the sampled current value according to Table 1.

TABLE 1

| Motor Direction | Motor Position | $i_q$ Phase Assignment |
| --- | --- | --- |
| Positive | −15 degrees to 7.5 degrees | I_A_NORM |
| Positive | 45 degrees to 67.5 degrees | I_B_NORM |
| Positive | 105 degrees to 127.5 degrees | I_C_NORM |
| Positive | 165 degrees to 187.5 degrees | I_A_NORM |
| Positive | 225 degrees to 247.5 degrees | I_B_NORM |
| Positive | 285 degrees to 307.5 degrees | I_C_NORM |
| Negative | −7.5 degrees to 15 degrees | I_A_NORM |
| Negative | 52.5 degrees to 75 degrees | I_B_NORM |
| Negative | 112.5 degrees to 135 degrees | I_C_NORM |

TABLE 1-continued

| Motor Direction | Motor Position | $i_q$ Phase Assignment |
| --- | --- | --- |
| Negative | 172.5 degrees to 195 degrees | I_A_NORM |
| Negative | 232.5 degrees to 255 degrees | I_B_NORM |
| Negative | 292.5 degrees to 315 degrees | I_C_NORM |

Figure 17:
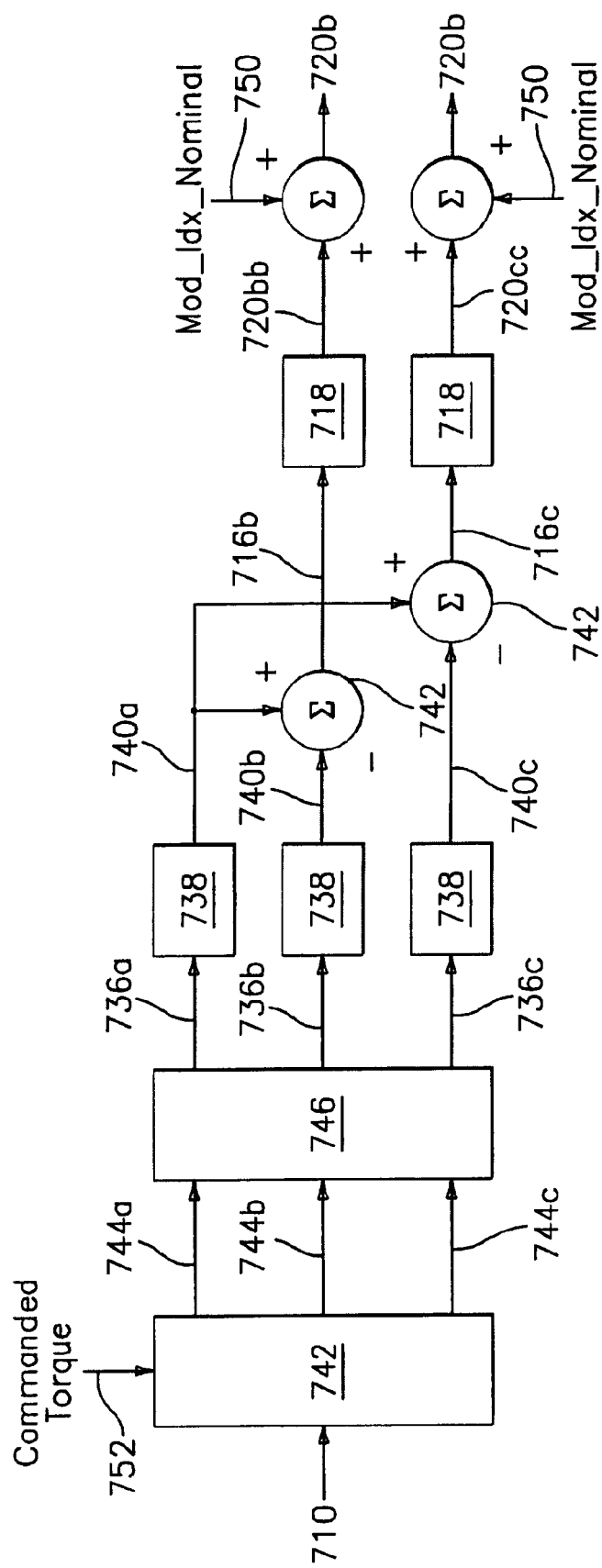
FIG. 17 is a schematic diagram of an imbalance compensator of the present invention.

A positive direction refers to increasing motor position angles such that the motor generated voltage characteristic transitions through an a-b-c sequence. Motor position is referenced to a sinusoidal function associated with the motor phase A-to-neutral generated voltage characteristic. In FIG. 17, the signal iq 710 is normalized at 742 to an average value 744a, 744b, 744c prior to the phase assignments of Table 1 at 746. Normalized and phased variables I_A_NORM, I_B_NORM, I_C_NORM 736a, 736b, 736c are subsequently provided as input to individual low pass filters 738. The low pass filters 738 may be implemented according to the equations $$I\_A\_NORM\_AVE(k) = \alpha \times I\_A\_NORM\_AVE(k-1) + (\alpha-1) \times I\_A\_NORM(k) \quad (54a)$$

$$I\_B\_NORM\_AVE(k) = \alpha \times I\_B\_NORM\_AVE(k-1) + (\alpha-1) \times I\_B\_NORM(k) \quad (54b)$$

$$I\_C\_NORM\_AVE(k) = \alpha \times I\_C\_NORM\_AVE(k-1) + (\alpha-1) \times I\_C\_NORM(k) \quad (54c)$$

The filter parameter a may be set as a design variable to a value in accordance with the Table 2.

TABLE 2

| Parameter Name | Minimum Value | Maximum Value | Nominal Value |
| --- | --- | --- | --- |
| α | 0.0625 | 0.250 | 0.125 |

This results in a set of normalized and filtered phase current variables I_A_NORM_AVE, I_B_NORM_AVE and I_C_NORM_AVE, 740a, 740b, 740c.

In general, one phase may be selected as a reference phase and the remaining phases may be adjusted with respect to the reference phase to reduce the imbalance levels. In the following, it is assumed that phase A is the reference phase and therefore ModIdx$_a$ signal is set to a nominal level. The phase B voltage magnitude, Mod_Idx$_b$, is set to a value equal to Phase_B_Mag_Correction×Mod_Idx$_a$. In a similar manner, the phase C voltage magnitude, Mod_Idx$_c$ is set to a value equal to Phase_C_Mag_Correction×Mod_Idx$_a$. The imbalance correction terms 720a(equal to zero in FIG. 17 for purposes of exemplification only), 720b, 720c are computed as shown in FIG. 17.

The imbalance compensator 718 is the controller function K(jω) in Eqn. 48. A second order filter with two zeros and two poles is adequate for most applications. The general form of the filter is a digital realization of a PID controller with transfer function $G_D(z)$:

$$G_D(z) = \frac{b_0 + b_1 z^{-1} + b_2 z^{-2}}{1 + a_1 z^{-1} + a_2 z^{-2}} \quad (55)$$

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein by reference, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein by reference, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein by reference are not to be construed as limiting to the claims.

What is claimed is:

1. A method of minimizing the torque ripple produced by unbalanced phase currents in a sinusoidally excited motor, the method comprising:
   measuring the position of the motor;
   sampling the phase currents of the motor generating thereby at least one phase current;
   synchronizing the at least one phase current of the motor with the position of the motor;
   determining the imbalance in the magnitudes of the at least one phase current of the motor;
   generating a set of modulation index terms for reducing the imbalance in the magnitudes of the at least one phase current to ensure acceptable torque ripple characteristics over the operating velocity of the motor; and
   responsive to the set of modulation index terms, generating a set of minimized line-to-ground voltage commands.

2. The method as set forth in claim 1 further comprising:
   converting the set of minimized line-to-ground voltage commands into a set of modulation commands; and
   converting the set of modulation commands into a set of phase currents.

3. The method as set forth in claim 2 further comprising determining the imbalance in the phases of the at least one phase current of the motor; and
   generating a set of phase angle offset variables for reducing the imbalance in the phases of the phase currents to ensure acceptable torque ripple characteristics over the operating velocity of the motor.

4. The method as set forth in claim 2 wherein generating a set of minimized line-to-ground voltage command includes:
   adding the measured position of the motor to a set of phase shift terms;
   calculating a trigonometric function of the summation of the measured position of the motor and the set of phase shift terms;
   multiplying the trigonometric function of the summation of the measured position of the motor and the set of phase shift terms by the set of modulation index terms, generating thereby a set of line-to-ground voltage commands;

comparing the instantaneous values of the set of line-to-ground voltage commands;

selecting the minimum value of the get of line-to-ground voltage commands;

subtracting the minimum value of the set of line-to-ground voltage commands from the set of line-to-ground voltage commands providing thereby a set of minimized line-to-voltage commands.

5. The method as set forth in claim 4 wherein calculating a trigonometric function includes calculating the trigonometric sine.

6. The method as set forth in claim 3 wherein generating a set of minimized line-to-ground voltage commands includes:

adding the measured position of the motor to the set of phase angle offset variables;

adding the summation of the measured position of the motor and the set of phase angle offset variables to a set of phase shift terms;

calculating a trigonometric function of the summation of the measured position of the motor and the set of phase angle offset variables and the set of phase shift terms;

multiplying the trigonometric function of the summation of the measured position of the motor and the set of phase angle offset variables and the set of phase shift terms by the set of modulation index terms, generating thereby a set of line-to-ground voltage commands;

comparing the instantaneous values of the set of line-to-ground voltage commands;

selecting the minimum value of the set of line-to-ground voltage commands; and subtracting the minimum value of the set of line-to-ground voltage commands from the set of line-to-ground voltage commands generating thereby a set of minimized line-to-voltage commands.

7. The method as set forth in claim 6 wherein calculating a trigonometric function includes calculating the trigonometric sine.

8. A method of generating a set of minimized line-to-ground voltage commands for minimizing the torque ripple produced by unbalanced phase currents in a sinusoidally excited motor in an automotive steering system, the method comprising:

measuring the position of the motor;

generating a set of modulation index terms;

adding the measured position of the motor to a set of phase shift terms;

calculating a trigonometric function of the summation of the measured position of the motor and the set of phase shift terms;

multiplying the trigonometric function of the summation of the measured position of the motor and the set of phase shift terms by the set of modulation index terms, generating thereby a set of line-to-ground voltage commands;

comparing the instantaneous values of the set of line-to-ground voltage commands;

selecting the minimum value of the set of line-to-ground voltage commands;

subtracting the minimum value of the set of line-to-ground voltage commands from the set of line-to-ground voltage commands providing thereby a set of minimized line-to-voltage commands.

9. The method as set forth in claim 8 wherein calculating a trigonometric function includes calculating a trigonometric sine function.

10. The method as set forth in claim 8 further comprising generating a set of phase angle offset variables.

11. The method as set forth in claim 10 further comprising:

adding the measured position of the motor to the set of phase angle offset variables;

adding the summation of the measured position of the motor and the set of phase angle offset variables to the set of phase shift terms;

calculating a trigonometric function of the summation of the measured position of the motor and the set of phase angle offset variables and the set of phase shift terms;

multiplying the trigonometric function of the summation of the measured position of the motor and the set of phase angle offset variables and the set of phase shift terms by the set of modulation index terms, generating thereby a set of line-to-ground voltage commands;

comparing the instantaneous values of the set of line-to-ground voltage commands;

selecting the minimum value of the set of line-to-ground voltage commands; and subtracting the minimum value of the set of line-to-ground voltage commands from the set of line-to-ground voltage commands generating thereby a set of minimized line-to-voltage commands.

12. The method as set forth in claim 11 wherein calculating a trigonometric function includes calculating a trigonometric sine.

13. A storage medium encoded with machine-readable computer program code for minimizing the torque ripple produced by unbalanced phase currents in a sinusoidally excited motor in an automotive steering system, the computer code being executable whereby the computer code when run by a computer system will minimize the torque ripple produced by unbalanced phase currents in a sinusoidally excited motor in an automotive steering system, the program code including instructions for causing the computer system to implement a method comprising:

measuring the position of the motor;

sampling the phase currents of the motor generating thereby at least one phase current;

synchronizing the at least one phase current of the motor with the position of the motor;

determining the imbalance in the magnitudes of the at least one phase current of the motor;

generating a set of modulation index terms for reducing the imbalance in the magnitudes of the at least one phase current to ensure acceptable torque ripple characteristics over the operating velocity of the motor; and responsive to the set of modulation index terms, generating a set of minimized line-to-ground voltage commands.

14. The method as set forth in claim 13 further comprising:

converting the set of minimized line-to-ground voltage commands into a set of modulation commands; and converting the set of modulation commands into a set of phase currents.

15. The method as set forth in claim 14 further comprising:

determining the imbalance in the phases of the at least one measured phase current of the motor; and generating a set of phase angle offset variables for reducing the imbalance in the phases of the measured phase currents to ensure acceptable torque ripple characteristics over the operating velocity of the motor.

16. The method as set forth in claim 14 wherein generating a set of minimized line-to-ground voltage command includes;

adding the measured position of the motor to a set of phase shift terms;

calculating a trigonometric function of the summation of the measured position of the motor and the set of phase shift terms;

multiplying the trigonometric function of the summation of the measured position of the motor and the set of phase shift terms by the set of modulation index terms, generating thereby a set of line-to-ground voltage commands;

comparing the instantaneous values of the set of line-to-ground voltage commands;

selecting the minimum value of the set of line-to-ground voltage commands;

subtracting the minimum value of the set of line-to-ground voltage commands from the set of line-to-ground voltage commands providing thereby a set of minimized line-to-voltage commands.

17. The method as set forth in claim 16 wherein calculating a trigonometric function includes calculating the trigonometric sine.

18. The method as set forth in claim 15 wherein generating a set of minimized line-to-ground voltage commands includes:

adding the measured position of the motor to the set of phase angle offset variables;

adding the summation of the measured position of the motor and the set of phase angle offset variables to a set of phase shift terms;

calculating a trigonometric function of the summation of the measured position of the motor and the set of phase angle offset variables and the set of phase shift terms;

multiplying the trigonometric function of the summation of the measured position of the motor and the set of phase angle offset variables and the set of phase shift terms by the set of modulation index terms, generating thereby a set of line-to-ground voltage commands;

comparing the instantaneous values of the set of line-to-ground voltage commands;

selecting the minimum value of the set of line-to-ground voltage commands; and subtracting the minimum value of the set of line-to-ground voltage commands from the set of line-to-ground voltage commands generating thereby a set of minimized line-to-voltage commands.

19. The method as set forth in claim 18 wherein calculating a trigonometric function includes calculating the trigonometric sine.

20. A storage medium encoded with machine-readable computer program code for generating a set of minimized line-to-ground voltage commands for minimizing the torque ripple produced by unbalanced phase currents in a sinusoidally excited motor in an automotive steering system, the computer code being executable whereby the computer code when run by a computer system will minimize line-to-ground voltage commands for minimizing the torque ripple produced by unbalanced phase currents in a sinusoidally excited motor in an automotive steering system, the program code including instructions for causing the computer system to implement a method comprising:

measuring the position of the motor;

generating a set of modulation index terms;

adding the measured position of the motor to a set of phase shift terms;

calculating a trigonometric function of the summation of the measured position of the motor and the set of phase shift terms;

multiplying the trigonometric function of the summation of the measured position of the motor and the set of phase shift terms by the set of modulation index terms, generating thereby a set of line-to-ground voltage commands;

comparing the instantaneous values of the set of line-to-ground voltage commands;

selecting the minimum value of the set of line-to-ground voltage commands;

subtracting the minimum value of the set of line-to-ground voltage commands from the set of line-to-ground voltage commands providing thereby a set of minimized line-to-voltage commands.

21. The method as set forth in claim 20 wherein calculating a trigonometric function includes calculating a trigonometric sine function.

22. The method as set forth in claim 20 further comprising generating a set of phase angle offset variables.

23. The method as set forth in claim 22 further comprising:

adding the measured position of the motor to the set of phase angle offset variables;

adding the summation of the measured position of the motor and the set of phase angle offset variables to the set of phase shift terms;

calculating a trigonometric function of the summation of the measured position of the motor and the set of phase angle offset variables and the set of phase shift terms;

multiplying the trigonometric function of the summation of the measured position of the motor and the set of phase angle offset variables and the set of phase shift terms by the set of modulation index terms, generating thereby a set of line-to-ground voltage commands;

comparing the instantaneous values of the set of line-to-ground voltage commands;

selecting the minimum value of the set of line-to-ground voltage commands; and subtracting the minimum value of the set of line-to-ground voltage commands from the set of line-to-ground voltage commands generating thereby a set of minimized line-to-voltage commands.

24. The method as set forth in claim 23 wherein calculating a trigonometric function includes calculating a trigonometric sine.

25. The method as set forth in claim 1 wherein determining the imbalance in the magnitudes of the at least one phase current of the motor includes:

normalizing the at least one phase current;

assigning a phase to the at least one phase current; and filtering the at least one phase current.

26. The method as set forth in claim 25 wherein normalizing the at least one phase current includes normalizing the at least one phase current to an average value thereof.

27. The method as set forth in claim 3 wherein the imbalance in the phases of the at least one phase current of the motor includes:

normalizing the at least one phase current;

assigning a phase to the at least one phase current; and filtering the at least one phase current.

28. The method as set forth in claim 27 wherein normalizing the at least one phase current includes normalizing the at least one phase current to an average value thereof.

29. The method as set forth in claim 13 wherein determining the imbalance in the magnitudes of the at least one phase current of the motor includes:

normalizing the at least one phase current;

assigning a phase to the at least one phase current; and filtering the at least one phase current.

30. The method as set forth in claim 29 wherein normalizing the at least one phase current includes normalizing the at least one phase current to an average value thereof.

31. The method as set forth in claim 15 wherein the imbalance in the phases of the at least one phase current of the motor includes:

normalizing the at least one phase current;

assigning a phase to the at least one phase current; and filtering the at least one phase current.

32. The method as set forth in claim 31 wherein normalizing the at least one phase current includes normalizing the at least one phase current to an average value thereof.

33. The method as set forth in claim 25 further comprising:

selecting a phase as a reference phase; and adjusting the remaining phases with respect to the reference phase.

34. The method as set forth in claim 33 further comprising:

setting the modulation index term corresponding to the reference phase equal to a nominal value; and setting the modulation index terms corresponding to the remaining phases equal to a correction factor times the modulation index term corresponding to the reference phase.

35. The method as set forth in claim 25 wherein assigning a phase to the at least one phase current includes assigning a phase thereto according to the table:

| Motor Direction | Motor Position | $i_q$ Phase Assignment |
| --- | --- | --- |
| Positive | −15 degrees to 7.5 degrees | I_A_NORM |
| Positive | 45 degrees to 67.5 degrees | I_B_NORM |
| Positive | 105 degrees to 127.5 degrees | I_C_NORM |
| Positive | 165 degrees to 187.5 degrees | I_A_NORM |
| Positive | 225 degrees to 247.5 degrees | I_B_NORM |
| Positive | 285 degrees to 307.5 degrees | I_C_NORM |
| Negative | −7.5 degrees to 15 degrees | I_A_NORM |
| Negative | 52.5 degrees to 75 degrees | I_B_NORM |
| Negative | 112.5 degrees to 135 degrees | I_C_NORM |
| Negative | 172.5 degrees to 195 degrees | I_A_NORM |
| Negative | 232.5 degrees to 255 degrees | I_B_NORM |
| Negative | 292.5 degrees to 315 degrees | I_C_NORM | wherein a positive motor direction refers to increasing motor position angles such that the motor generated voltage characteristic transitions through an a-b-c sequence and motor position is referenced to a sinusoidal function associated with the motor phase reference-to-neutral generated voltage characteristic.

36. The method as set forth in claim 27 further comprising:

selecting a phase as a reference phase; and adjusting the remaining phases with respect to the reference phase.

37. The method as set forth in claim 36 further comprising:

setting the modulation index term corresponding to the reference phase equal to a nominal value; and setting the modulation index terms corresponding to the remaining phases equal to a correction factor times the modulation index term corresponding to the reference phase.

38. The method as set forth in claim 27 wherein assigning a phase to the at least one phase current includes assigning a phase thereto according to the table:

| Motor Direction | Motor Position | $i_q$ Phase Assignment |
| --- | --- | --- |
| Positive | −15 degrees to 7.5 degrees | I_A_NORM |
| Positive | 45 degrees to 67.5 degrees | I_B_NORM |
| Positive | 105 degrees to 127.5 degrees | I_C_NORM |
| Positive | 165 degrees to 187.5 degrees | I_A_NORM |
| Positive | 225 degrees to 247.5 degrees | I_B_NORM |
| Positive | 285 degrees to 307.5 degrees | I_C_NORM |
| Negative | −7.5 degrees to 15 degrees | I_A_NORM |
| Negative | 52.5 degrees to 75 degrees | I_B_NORM |
| Negative | 112.5 degrees to 135 degrees | I_C_NORM |
| Negative | 172.5 degrees to 195 degrees | I_A_NORM |
| Negative | 232.5 degrees to 255 degrees | I_B_NORM |
| Negative | 292.5 degrees to 315 degrees | I_C_NORM | wherein a positive motor direction refers to increasing motor position angles such that the motor generated voltage characteristic transitions through an a-b-c sequence and motor position is referenced to a sinusoidal function associated with the motor phase reference-to-neutral generated voltage characteristic.

39. The method as set forth in claim 31 further comprising:

selecting a phase as a reference phase; and adjusting the remaining phases with respect to the reference phase.

40. The method as set forth in claim 39 further comprising:

setting the modulation index term corresponding to the reference phase equal to a nominal value; and setting the modulation index terms corresponding to the remaining phases equal to a correction factor times the modulation index term corresponding to the reference phase.

41. The method as set forth in claim 31 wherein assigning a phase to the at least one phase current includes assigning a phase thereto according to the table:

| Motor Direction | Motor Position | $i_q$ Phase Assignment |
| --- | --- | --- |
| Positive | −15 degrees to 7.5 degrees | I_A_NORM |
| Positive | 45 degrees to 67.5 degrees | I_B_NORM |
| Positive | 105 degrees to 127.5 degrees | I_C_NORM |
| Positive | 165 degrees to 187.5 degrees | I_A_NORM |
| Positive | 225 degrees to 247.5 degrees | I_B_NORM |
| Positive | 285 degrees to 307.5 degrees | I_C_NORM |
| Negative | −7.5 degrees to 15 degrees | I_A_NORM |
| Negative | 52.5 degrees to 75 degrees | I_B_NORM |
| Negative | 112.5 degrees to 135 degrees | I_C_NORM |
| Negative | 172.5 degrees to 195 degrees | I_A_NORM |
| Negative | 232.5 degrees to 255 degrees | I_B_NORM |
| Negative | 292.5 degrees to 315 degrees | I_C_NORM | wherein a positive motor direction refers to increasing motor position angles such that the motor generated voltage characteristic transitions through an a-b-c sequence and motor position is referenced to a sinusoidal function associated with the motor phase reference-to-neutral generated voltage characteristic.

\* \* \* \* \*